United States Patent
Ishimaru et al.

(10) Patent No.: US 11,928,871 B2
(45) Date of Patent: Mar. 12, 2024

(54) VEHICLE POSITION ESTIMATION DEVICE AND TRAVELING POSITION ESTIMATION METHOD

(71) Applicant: DENSO CORPORATION, Kariya (JP)

(72) Inventors: Kazuhisa Ishimaru, Nisshin (JP); Shunya Kumano, Nisshin (JP); Yuusuke Matsumoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/069,018

(22) Filed: Dec. 20, 2022

(65) Prior Publication Data
US 2023/0122011 A1    Apr. 20, 2023

Related U.S. Application Data

(63) Continuation of application No. PCT/JP2021/022461, filed on Jun. 14, 2021.

(30) Foreign Application Priority Data

Jun. 23, 2020 (JP) ................................. 2020-107959

(51) Int. Cl.
| | |
|---|---|
| *B60W 30/12* | (2020.01) |
| *B60W 40/06* | (2012.01) |
| *G06T 7/60* | (2017.01) |
| *G06V 10/74* | (2022.01) |
| *G06V 20/56* | (2022.01) |

(52) U.S. Cl.
CPC ............. *G06V 20/588* (2022.01); *G06T 7/60* (2013.01); *G06V 10/761* (2022.01); *G06T 2207/30256* (2013.01); *G06V 2201/07* (2022.01)

(58) Field of Classification Search
None
See application file for complete search history.

(56) References Cited

U.S. PATENT DOCUMENTS

| | | | |
|---|---|---|---|
| 2008/0273750 A1* | 11/2008 | Fujimoto | G06V 40/10 348/148 |
| 2018/0273031 A1* | 9/2018 | Fujita | G05D 1/021 |
| 2019/0100200 A1 | 4/2019 | McNew et al. | |
| 2019/0103023 A1 | 4/2019 | McNew et al. | |

(Continued)

FOREIGN PATENT DOCUMENTS

| | | |
|---|---|---|
| JP | 2002-225657 A | 8/2002 |
| JP | 2013-242670 A | 12/2013 |

*Primary Examiner* — Samuel D Fereja
(74) *Attorney, Agent, or Firm* — MASCHOFF BRENNAN

(57) ABSTRACT

A vehicle position estimation device is configured to acquire a distance from a road edge to a subject vehicle using at least one of an imaging device or a distance measuring sensor, acquire position information of lane boundary lines detected by analyzing the images captured by the imaging device; acquire map information including a lane quantity of a traveling road of the subject vehicle from a map storage, calculate, as a roadside area width, a lateral direction distance between an outermost detection line, which is an outermost boundary line among the detected boundary lines, and the road edge, and specify a traveling lane of the subject vehicle based on (i) the distance from the road edge to the subject vehicle, (ii) the roadside area width, and (iii) the lane quantity included in the acquired map information.

12 Claims, 13 Drawing Sheets

(56) References Cited

U.S. PATENT DOCUMENTS

| | | |
|---|---|---|
| 2020/0003563 A1 | 1/2020 | Miyake et al. |
| 2020/0003567 A1 | 1/2020 | Minamiguchi et al. |
| 2021/0031804 A1* | 2/2021 | Oyama ................ B60W 40/06 |
| 2022/0144273 A1* | 5/2022 | Yamaguchi ..... B60W 30/18159 |

* cited by examiner

VEHICLE POSITION ESTIMATION DEVICE AND TRAVELING POSITION ESTIMATION METHOD

CROSS REFERENCE TO RELATED APPLICATIONS

The present application is a continuation application of International Patent Application No. PCT/JP 2021/022461 filed on Jun. 14, 2021, which designated the U.S. and claims the benefit of priority from Japanese Patent Application No. 2020-107959 filed on Jun. 23, 2020. The entire disclosures of all of the above applications are incorporated herein by reference.

TECHNICAL FIELD

The present disclosure relates to a technology that specifies a traveling position of subject vehicle on a road.

BACKGROUND

There has been known a method for specifying a lane in which a subject vehicle is travelling (hereinafter referred to as a traveling lane).

SUMMARY

The present disclosure provides a vehicle position estimation device, which is configured to acquire a distance from a road edge to a subject vehicle using at least one of an imaging device or a distance measuring sensor, acquire position information of lane boundary lines detected by analyzing the images captured by the imaging device; acquire map information including a lane quantity of a traveling road of the subject vehicle from a map storage, calculate, as a roadside area width, a lateral direction distance between an outermost detection line, which is an outermost boundary line among the detected boundary lines, and the road edge, and specify a traveling lane of the subject vehicle based on (i) the distance from the road edge to the subject vehicle, (ii) the roadside area width, and (iii) the lane quantity included in the acquired map information.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
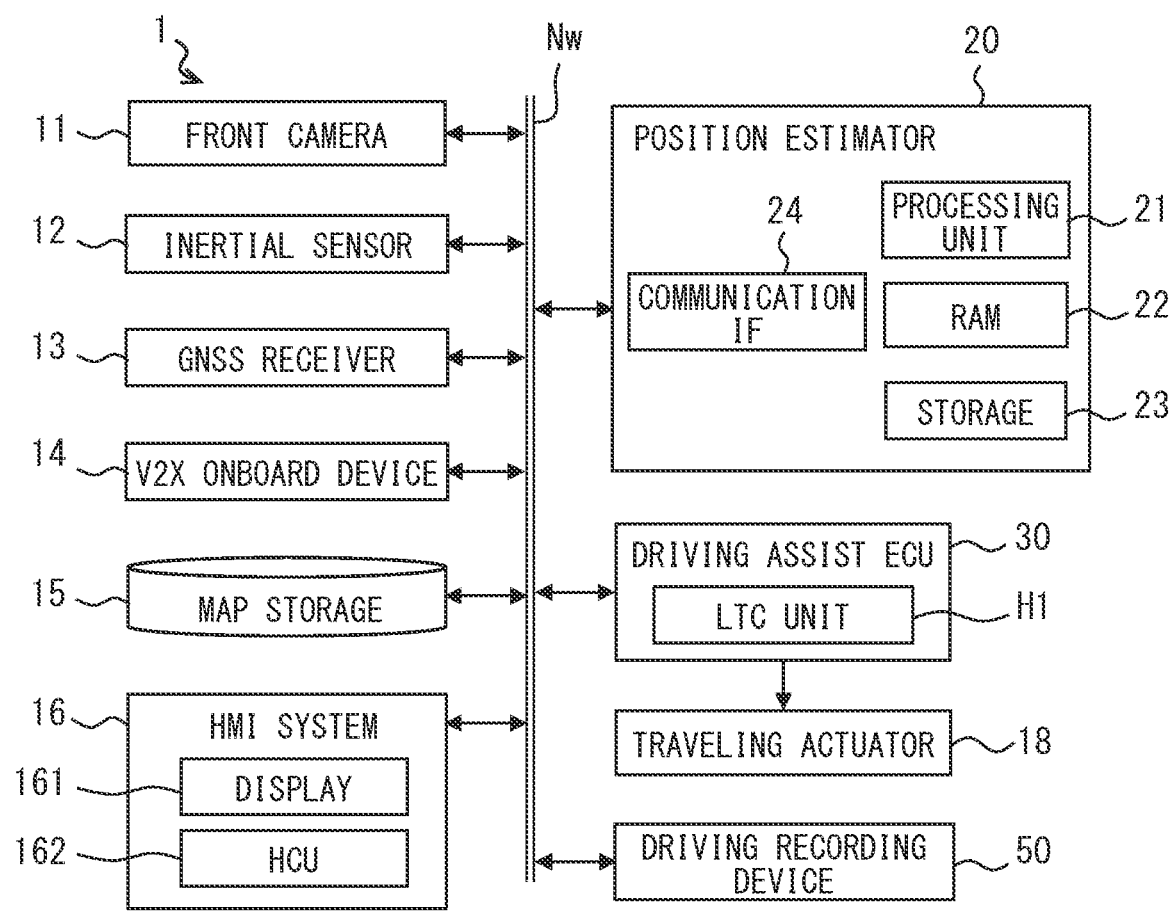
FIG. 1 is a block diagram showing a configuration of a driving assist system.

Before describing embodiments of the present disclosure, a known art will be described. There has been known a method for specifying of a lane in which a subject vehicle is travelling (hereinafter referred to as a traveling lane) when counted from a left or right edge of a road based on a type of lane boundary line existing on right or left side of the subject vehicle. Further, a configuration for specifying a traveling lane of subject vehicle using trajectory information of other vehicles traveling around the subject vehicle is known.

When the road has multiple lanes, such as four or more lanes, and the type of lane boundary line on the left side of the subject vehicle is the same as the type of lane boundary line on the right side of the subject vehicle, it is difficult to specify the traveling lane of subject vehicle. Within a section in which the lane boundary line is blurred, the type of lane boundary line is difficult to be specified. For example, when the lane boundary line, which is originally painted as a solid line, is recognized as a broken line due to faintness or dirt, the traveling lane of subject vehicle may be incorrectly specified.

In the configuration where the traveling lane of subject vehicle is specified using trajectory information of other vehicles traveling around the subject vehicle, it is expected that the traveling driving lane can be specified even in an environment in which the type of lane boundary line existing on right or left side of the subject vehicle cannot be specified. However, when the traveling lane of subject vehicle is specified using trajectory information of other vehicles, there is a difficulty that the traveling lane cannot be specified when no different vehicle exists around the subject vehicle. With consideration of the above-described difficulty, the present disclosure provides a vehicle position estimation device and a traveling position estimation method, each of which can specify a traveling lane of subject vehicle in a case where no different vehicle exists around the subject vehicle.

According to an aspect of the present disclosure, a vehicle position estimation device includes a road edge information acquisition unit, a map acquisition unit, a boundary line information acquisition unit, a roadside area width calculation unit, and a traveling lane specification unit. The road edge information acquisition unit acquires a distance from a subject vehicle to a road edge using at least one of an imaging device or a distance measuring sensor. The imaging device captures images of a predetermined range around the subject vehicle, and the distance measuring sensor detects an object existing in a predetermined direction relative to the subject vehicle by transmitting a probe wave or a laser beam. The map acquisition unit acquires map information including a lane quantity of a traveling road of the subject vehicle from a map storage disposed inside or outside of the subject vehicle. The boundary line information acquisition unit acquires position information of lane boundary lines detected by analyzing the images captured by the imaging device. The roadside area width calculation unit calculates, as a roadside area width, a lateral direction distance between an outermost detection line, which is an outermost boundary line among the detected boundary lines, and the road edge. The traveling lane specification unit specifies a traveling lane of the subject vehicle, in which the subject vehicle is traveling, based on (i) the distance from the subject vehicle to the road edge, (ii) the roadside area width, and (iii) the lane quantity included in the map information acquired by the map acquisition unit.

The above configuration acquires the lane quantity shown on the map and the position information of the road edge with respect to the subject vehicle. The position information of the road edge relative to the subject vehicle may include distance information indicating a distance from the subject vehicle to the road edge. Usually, a width of one traveling lane is defined by laws or the like. Thus, when the distance from the road edge to the subject vehicle is known, it is possible to specify the traveling lane in which the subject vehicle is traveling. When the lane quantity included in the road is known, it is possible to estimate a width of a roadside area, which is an area other than the traveling lanes defined on the road. According to the above configuration, it is possible to specify the traveling lane of subject vehicle with consideration of the width of roadside area. In the above configuration, the type of lane boundary line and the trajectory information of the periphery vehicle are not required in specifying of the traveling lane of subject vehicle. In a case where the road has multiple traveling lanes, such as four or more traveling lanes, the traveling lane of subject vehicle can be specified even though no periphery vehicle exists around the subject vehicle.

According to another aspect of the present disclosure, a traveling position estimation method executed by at least one processor for specifying a traveling lane in which a subject vehicle is traveling is provided. The traveling position estimation method includes: acquiring a distance from a road edge to a subject vehicle using at least one of an imaging device or a distance measuring sensor, the imaging device capturing images of a predetermined range around the subject vehicle, the distance measuring sensor detecting an object existing in a predetermined direction relative to the subject vehicle by transmitting a probe wave or a laser beam; acquiring position information of lane boundary lines detected by analyzing the images captured by the imaging device; acquiring map information including a lane quantity of a traveling road of the subject vehicle from a map storage disposed inside or outside of the subject vehicle; calculating, as a roadside area width, a lateral direction distance between an outermost detection line, which is an outermost boundary line among the detected boundary lines, and the road edge; and specifying a traveling lane of the subject vehicle, in which the subject vehicle is traveling, based on (i) distance from the road edge to the subject vehicle, (ii) the roadside area width, and (iii) the lane quantity included in the acquired map information.

According to the above method, it is possible to specify the traveling lane of subject vehicle even when no different vehicle exists around the subject vehicle, similar to the above-described vehicle position estimation device.

The following will describe embodiments of the present disclosure with reference to the drawings. FIG. 1 is a diagram showing an example of a schematic configuration of a driving assist system 1 to which a position estimator of the present disclosure is applied.

(Overview of Overall Configuration)

As shown in FIG. 1, the driving assist system 1 includes a front camera 11, an inertial sensor 12, a GNSS receiver 13, a V2X onboard device 14, a map storage 15, an HMI system 16, a position estimator 20, a driving assist ECU 30, and a driving recording device 50. The ECU used in the above-described names is an abbreviation for electronic control unit, and indicates an electronic control device. The HMI is an abbreviation for human machine interface. The V2X is an abbreviation for vehicle to x (everything) and refers to a communication technology that connects various things to a vehicle.

The various devices or sensors included in the driving assist system 1 are connected to an in-vehicle network Nw as nodes. The in-vehicle network is a communication network built in the vehicle. The nodes connected to the in-vehicle network Nw can communicate with one another. Specific devices may be configured to be able to communicate directly with one another without communicating through the in-vehicle network Nw. For example, the position estimator 20 may be electrically connected in direct manner by a dedicated line with the driving assist ECU 30. Although the in-vehicle network Nw is configured as a bus type as shown in FIG. 1, the configuration of the in-vehicle network is not limited to the exemplary configuration shown in FIG. 1. A network topology of the in-vehicle network may be a mesh type, a star type, a ring type, or the like. A network shape can be changed as appropriate. The in-vehicle network Nw may adopt various network standards, such as Controller Area Network (hereinafter referred to as CAN, registered trademark), Ethernet (registered trademark), FlexRay (registered trademark).

Hereinafter, a vehicle on which the driving assist system 1 is mounted is also described as a subject vehicle, and an occupant seated in a driver's seat of the subject vehicle (that is, occupant in the driver's seat) is also described as a user. In the following description, a front rear direction, a lateral direction, and an up down direction are defined with reference to the subject vehicle. The front rear direction corresponds to a longitudinal direction of the subject vehicle. The lateral direction corresponds to a width direction of the subject vehicle. The up down direction corresponds to a vehicle height direction. From another point of view, the up down direction corresponds to a direction perpendicular to a plane parallel to both of the front rear direction and the lateral direction.

(Overview of Each Component)

Figure 2:
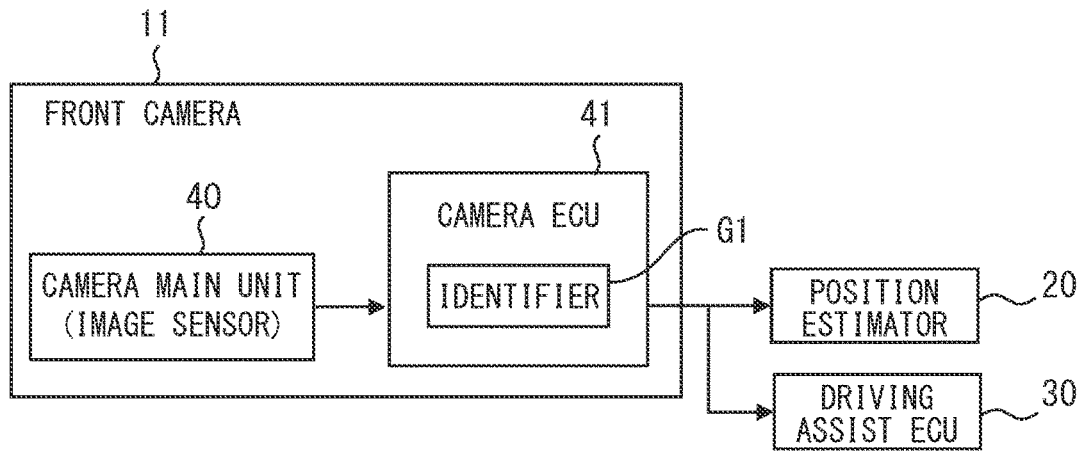
FIG. 2 is a block diagram showing a configuration of a front camera.

The front camera 11a captures images of a front area of vehicle at a predetermined angle of view. The front camera 11a is disposed, for example, at an upper end portion of a front windshield in a vehicle compartment, a front grille, or a roof top. As shown in FIG. 2, the front camera 11 includes a camera main unit 40, which generates an image frame, and an ECU (hereinafter referred to as a camera ECU) 41, which detects a predetermined detection target by performing a recognition process on the image frame. The camera main unit 40 includes at least an imaging sensor and a lens, and generates and outputs captured image data at a predetermined frame rate (for example, 60 fps). The camera ECU 41 is implemented by an image processing chip. The image processing chip may include a central processing unit (CPU), a graphics processing unit (GPU), or the like. The camera ECU 41 includes an identifier G1 as a functional block. The identifier G1 identifies a type of a captured object based on a feature amount vector of the image generated by the camera main unit 40. The identifier G1 may identify an object by using, for example, convolutional neural network (CNN) or deep neural network (DNN), to each of which deep learning is applied.

A detection object of the front camera 11 may include, for example, a moving object, such as pedestrians or different vehicles. The different vehicle may include a bicycle, a motorized bicycle, or a motorcycle. The front camera 11 is configured to detect a predetermined road object. The road object to be detected by the front camera 11 may include a road edge, a road marking, and a structure installed along the roadside. The road marking is a marking that is painted on a road surface for traffic control and traffic regulation purpose. For example, the road marking may include a lane boundary line (also known as a lane marker) indicating a lane boundary, a pedestrian crossing, a stop line, a buffer zone, a safety zone, and a regulatory arrow. The lane boundary line may include road studs, such as chatter bars and Botts' dots. The structure installed along the roadside may include guard rails, curbs, trees, electric poles, traffic signs, or traffic lights. The camera ECU 41 separately extracts, from the captured image, a background and detection objects based on image information including information about color, brightness, contrast related to color and brightness, and the like.

The camera ECU 41 calculates, by performing structure from motion (SfM), a relative position with respect to the road object and a traveling speed from the captured image. The road object may include the lane boundary line, the road edge or the like. The relative position may include a relative distance from the road object and a direction relative to the road object. The relative position of road object with respect to the subject vehicle may be specified based on a size and a slope of the road object in the image. Further, the camera ECU 41 generates traveling road data indicating road shape, such as a road curvature, a road width, or the like, based on the positions and shapes of lane boundary lines and road edges.

The camera ECU 41 calculates regression equations for the right road edge and the left road edge, respectively, using a set of points corresponding to the road edges in an image coordinate system as a population. The regression equation is a function corresponding to a straight line or a curve line that approximately represents distribution of detection points. The regression equation may be calculated by, for example, the least squares method. For example, the image coordinate system may be defined with a pixel at an upper left corner of the image as an origin, with a right direction of the image as a positive direction of X-axis, and a downward direction of the image as a positive direction of Y-axis. For example, in the image coordinate system, each pixel center may be defined to have integer coordinate values.

The regression equation for each road edge may be expressed by a quadratic function with Y coordinate as a variable. Coefficient parameters included in the regression equation may be adjusted sequentially based on image recognition result of road edge. The number of dimensions of the regression equation can be changed as appropriate, and the regression equation may be a linear function or a cubic function other than quadratic function. The camera ECU 41 may calculate the regression equation of the lane boundary line, instead of the road edge. Hereinafter, the straight line or the curve line on the image coordinate system represented by the regression equation may be referred to as a regression line. Hereinafter, the regression equation and the regression line corresponding to the road edge will be described as an example.

The camera ECU 41 calculates a yaw rate (rotational angular velocity) of the subject vehicle based on the SfM. The camera ECU 41 sequentially provides the position estimator 20, the driving assist ECU 30, and the driving recording device 50 with detection result data including roadside regression equation parameters such as relative position and type of detected object via the in-vehicle network Nw.

The front camera 11 may be configured to provide, as observation data for object recognition purpose, image frames to the driving assist ECU 30 via the in-vehicle network Nw. The observation data is unprocessed data observed by the sensor, or data before recognition process is executed. The object recognition process may be executed based on the observation data by, for example, an external ECU other than a built-in ECU of the sensor, such as the driving assist ECU 30. The position estimator 20 may be configured to calculate the relative position of lane boundary line. A part of the functions of the camera ECU 41 (mainly the object recognition function) may be provided by the position estimator 20 or the driving assist ECU 30. In that case, the front camera 11 may provide, as observation data, the image data to the position estimator 20 or the driving assist ECU 30.

The inertial sensor 12 detects a specific physical state quantity, such as acceleration. The inertial sensor 12 may be a sensor group, which includes a triple-axis gyro sensor and a triple-axis acceleration sensor. The driving assist system 1 may include a magnetic sensor as the inertial sensor 12. The driving assist system 1 may include an atmospheric pressure sensor and a temperature sensor as the inertial sensors 12. The atmospheric pressure sensor and the temperature sensor can also be used for correcting output values of other sensors. The inertial sensor 12 may be packaged as an inertial measurement unit (IMU).

The inertial sensor 12 outputs data indicating a current value of the physical state quantity to be detected (that is, a detection result) to the in-vehicle network Nw. The position estimator 20 acquires the output data output from the inertial sensor 12 via the in-vehicle network Nw. A type of the sensor used by the driving assist system 1 as the inertial sensor 12 may be appropriately designed, and it is not necessary to include various type of sensors described above.

The GNSS receiver 13 is a device that sequentially (for example, every 100 milliseconds) detects a current position of the GNSS receiver 13 by receiving a navigation signal transmitted from a positioning satellite included in a global navigation satellite system (GNSS). As the GNSS, a global positioning system (GPS), a GLONASS, a Galileo, an IRNSS, a QZSS, a Beidou, and the like can be adopted.

The V2X onboard device 14 enables the subject vehicle to perform a wireless communication with another device. The "V" of V2X refers to an automobile as the subject vehicle, and the "X" refers to various objects other than the subject vehicle, such as a pedestrian, a different vehicle, a road facility, a network, or a server. The V2X onboard device 14 includes a wide area communication unit and a short range communication unit as communication modules. The wide area communication unit is a communication module for executing wireless communication compliant with a predetermined wide area wireless communication standard. As the wide area wireless communication standard here, various standards, such as long term evolution (LTE), 4G, or 5G, can be adopted. The wide area communication unit may be configured to execute wireless communication directly with other devices without going through a base station using a communication method compliant with the wide area wireless communication standard, in addition to a communication via a wireless base station. That is, the wide area communication unit may be configured to execute cellular V2X. The subject vehicle may be a connected car that can be connected to the Internet by mounting the V2X onboard device 14. For example, the position estimator 20 can download latest high accuracy map data from a predetermined server in cooperation with the V2X onboard device 14, and update the map data stored in the map storage 15.

The short range communication unit included in the V2X onboard device 14 is a communication module that executes a wireless communication directly with other moving objects or a roadside device existing around the subject vehicle under a short range communication standard, which has a communication range within several hundreds of meters. The other moving objects are not limited to the vehicles, and may include the pedestrian, the bicycle, or the like. As the short range communication standard, such as a wireless access in vehicular environment (WAVE) standard defined under IEEE1609 or a dedicated short range communications (DSRC) standard, can be adopted.

The map storage 15 is a non-volatile memory that stores high accuracy map data. The high accuracy map data corresponds to map data indicating a road structure, a position coordinate of a road object disposed along the road, and the like with an accuracy that can be used in the autonomous driving. The accuracy that can be used in the autonomous driving corresponds to, for example, a level in which an error between an actual position of each map element and a position registered on the map is suppressed within a range of 10 cm to 20 cm or less. For example, the high accuracy map data includes three-dimensional shape data of the road, lane data, or road object data. For example, the above-described three-dimensional shape data of the road may include node data related to a point (hereinafter, referred to as node) at which multiple roads intersect, merge, or branch, and link data related to a road connecting the points (hereinafter, referred to as link).

The link data indicates road edge information indicating position coordinates of the road edge, the width of the road, or the like. The link data may also include data indicating a road type, such as whether the road is a motorway or a general road. The motorway here refers to a road on which the pedestrian or the bicycle is prohibited from entering, such as a toll road or an expressway. The link data may include attribute information indicating whether autonomous driving is allowed in the road.

The lane data indicates the lane quantity, installation position information of lane boundary lines of each lane, traveling directions of each lane, and branching or merging points of each lane. The lane data may include, for example, information indicating whether the lane boundary line is provided by a solid line, a broken line, or Botts' dots. The position information of lane boundary line and the road edge (hereinafter referred to as lane boundary line and the like) is expressed as a coordinate group of points (that is, a point group) where the lane boundary is positioned. As another example, the position information of the lane boundary line and the like may be expressed by a polynomial expression. The position information of the lane boundary line and the like may be a set of line segments (that is, a line segment group) expressed by a polynomial expression.

The road object data may include position and type information of a road surface display, such as a stop line. The road object data may also include position, shape, and type information of a landmark. The landmark may include a three-dimensional structure installed along the roadside, such as the traffic sign, the traffic light, a pole, or a commercial sign. The map storage 15 may temporarily store the high accuracy map data within a predetermined distance from the subject vehicle. The map data stored in the map storage 15 may be navigation map data for navigation purpose. The navigation map data has an accuracy lower than that of the above-described high accuracy map data.

The HMI system 16 has an input interface function of receiving a user operation and an output interface function of presenting information to the user. The HMI system 16 includes a display 161 and an HMI Control Unit (HCU) 162. The HMI system 16 includes, as a device for presenting information to the user, a speaker, a vibrator, an illumination device (for example, an LED), or the like, in addition to the display 161.

The display 161 is configured to display images. For example, the display 161 may be displayed by a center display, which is provided at an uppermost portion of an instrument panel at a center of vehicle width direction. The display 161 corresponds to a center display. The display 161 is capable of displaying full color images, and can be implemented by a liquid crystal display, an organic light emitting diode (OLED) display, a plasma display, or the like. For example, the HMI system 16 may include a head-up display as the display 161, which projects a virtual image on a part of the front windshield in the front side of the driver's seat. For example, the display 161 may be provided by a meter display positioned in the front side of the driver's seat in the instrument panel.

The HCU 162 integrally controls information presentation to the user. For example, the HCU 162 may include a processor, such as a CPU or a GPU, a RAM, and a flash memory. The HCU 162 controls a display screen of the display 161 based on information provided by the driving assist ECU 30 and signals from an input device (not shown). For example, the HCU 162 displays a route guidance image on the display 161 according to a request output from the navigation device. The route guidance image includes turn-by-turn image that indicates a traveling direction or a recommended traveling lane at an intersection, a junction, or a location where the traveling lanes are increased.

The position estimator 20 specifies the current position of the subject vehicle. The position estimator 20 corresponds to a subject vehicle position estimation device. The position estimator 20 will be described in detail later. The position estimator 20 mainly includes a computer, and the computer may include a processing unit 21, a RAM 22, a storage 23, a communication interface 24, a bus connecting these components. The processing unit 21 is provided by hardware circuit and executes a calculation process in corporation with the RAM 22. The processing unit 21 corresponds to a processor. The processing unit 21 includes at least one arithmetic core, such as a CPU. The processing unit 21 executes various processes by accessing the RAM 22. The storage 23 includes a non-volatile storage medium, such as a flash memory. The storage 23 stores a position estimation program, which is a program to be executed by the processing unit 21. Execution of the position estimation program by the processing unit 21 corresponds to execution of a method (that is, a traveling position estimation method) corresponding to the position estimation program. The communication interface 24 communicates with other devices via the in-vehicle network Nw. The communication interface 24 may be implemented by an analog circuit element, an IC, or the like. The position estimator 20 may sequentially output, to the in-vehicle network Nw, the lane ID (i.e., traveling lane number) of the traveling lane on which the subject vehicle is traveling. The position estimator 20 may also output, to the in-vehicle network Nw, calculation results of a width of the roadside area, a type of the road object used to determine the position of subject vehicle, or the like.

The driving assist ECU 30 executes partial or overall control of the driving operation instead of the occupant in the driver's seat by controlling a traveling actuator 18 based on the detection results of the front camera 11 and the estimation results of the position estimator 20. The driving assist ECU 30 may have a function as an autonomous driving device that controls the vehicle to perform autonomous driving. The traveling actuator 18 refers to actuators used for traveling purpose. The traveling actuator 18 may include mechanical elements for vehicle acceleration, vehicle deceleration, and steering of the vehicle. For example, the traveling actuator 18 may include a brake device, an electronic throttle, a steering actuator, or the like. For example, the brake device may be provided by a brake actuator.

The driving assist ECU 30 includes a lane trace control (LTC) unit H1 that provides a lane trace control function as one of the vehicle control functions. The LTC function controls the subject vehicle to travel within a currently traveling lane of the subject vehicle along the currently traveling lane. The LTC unit H1 generates a planned traveling line along the currently traveling lane of the subject vehicle, and controls a steering angle, via the steering actuator, so that the subject vehicle travels following the planned traveling line. For example, the LTC unit H1 controls the subject vehicle to travel along a center of the traveling lane by generating a steering force in the direction toward the center of the traveling lane.

Similar to the position estimator 20, the driving assist ECU 30 mainly includes a computer, and the computer may include a processing unit, a RAM, a storage, a communication interface, and a bus connecting these components. For simplification, illustration of each component is omitted. The driving assist ECU 30 includes a storage, and the storage stores a driving assist program to be executed by the processing unit. Execution of the driving assist program by the processing unit corresponds to execution of a method corresponding to a driving assist program.

The driving recording device 50 records data indicating various conditions in the vehicle and various conditions out of the vehicle in traveling state of the vehicle. The conditions in the vehicle during traveling state of the vehicle may include an operation state of the position estimator 20, an operation state of the driving assist ECU 30, and a state of the occupant in the driver's seat. The data indicating the operation state of the position estimator 20 may include a road edge recognition state, a regression equation indicating the road edge, a calculation value of roadside area width, a type of road object used to determine the vehicle position, or the like. The data indicating the operation state of the driving assist ECU 30 may include a recognition result of periphery environment recognized by the driving assist ECU 30, a traveling plan, a calculation result of a target control amount of each traveling actuator, or the like. The data to be recorded are acquired, via the in-vehicle network Nw, from the ECUs and sensors installed in the vehicle, such as the position estimator 20, the driving assist ECU 30, peripheral monitoring sensors including the front camera, or the like. For example, when a predetermined recording event occurs, the driving recording device 50 stores data of a recording target item in a nonvolatile storage medium. For example, the storing destination of the data to be recorded by the driving recording device 50 may be provided by an external server.

(Function of Position Estimator 20)

Figure 3:
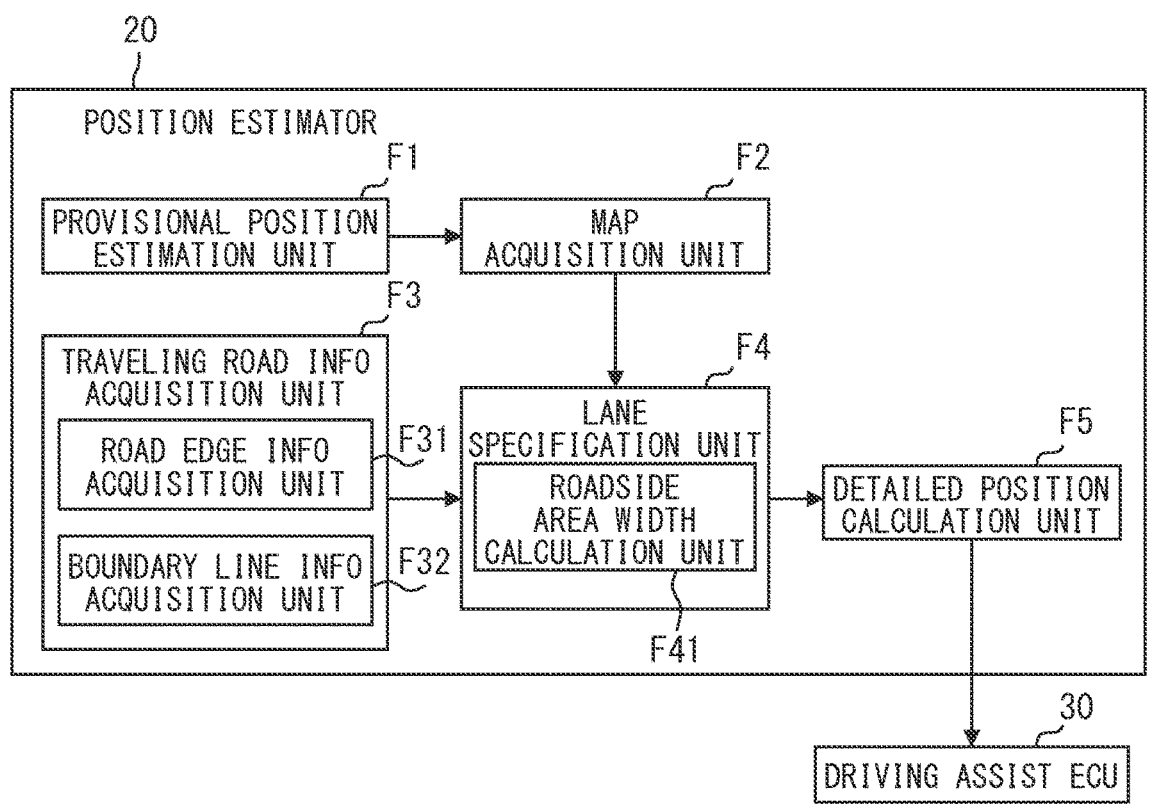
FIG. 3 is a block diagram showing a configuration of a position estimator.

The following will describe functions and an operation of the position estimator 20 with reference to FIG. 3. The position estimator 20 provides functions corresponding to various functional blocks shown in FIG. 3 by executing the position estimation program stored in the storage 23. That is, the position estimator 20 includes, as functional blocks, a provisional position estimation unit F1, a map acquisition unit F2, a traveling road information acquisition unit F3, a lane specification unit F4, and a detailed position calculation unit F5.

The provisional position estimation unit F1 sequentially specifies the position of subject vehicle by combining a positioning result of the GNSS receiver 13 and a measurement result of the inertial sensor 12. For example, the provisional position estimation unit F1 may perform a dead reckoning (autonomous navigation) using the yaw rate and the vehicle speed when the positioning results from the GNSS cannot be obtained, such as in a tunnel. The yaw rate used in the dead reckoning may be a yaw rate recognized by the camera ECU 41 using the SfM technology, or may be a yaw rate detected by the yaw rate sensor.

The map acquisition unit F2 reads, from the map storage 15, map data (map information) within a predetermined range determined based on the current position of the subject vehicle. The provisional position estimation unit F1 may specify the current position used for map reference, or the detailed position calculation unit F5 may specify the current position used for map reference. For example, when the detailed position calculation unit F5 can calculate the current position, the map data is acquired using the position information calculated by the detailed position calculation unit. When the detailed position calculation unit F5 cannot calculate the current position, the map data is acquired using the position coordinates calculated by the provisional position estimation unit F1. Immediately after an ignition switch of the vehicle is turned on, the map reference range is determined based on the previous position calculation result stored in the memory. This is because the previous position calculation result stored in the memory corresponds to an end point of the previous trip, that is, a parking position. The map acquisition unit F2 may sequentially download the high definition map data around the subject vehicle from an external server or the like via the V2X onboard device 14. The map storage 15 may be provided outside the vehicle.

The traveling road information acquisition unit F3 acquires traveling road data from the camera ECU 41 included in the front camera 11. The traveling road information acquisition unit F3 acquires relative position of the lane boundary line and the road edge (hereinafter referred to as lane boundary line and the like) and the regression line parameter of the road edge, which are recognized by the front camera 11. In the traveling road information acquisition unit, a configuration that acquires relative position information of the road edge corresponds to a road edge information acquisition unit F31. In the traveling road information acquisition unit, a configuration that acquires relative position information of lane boundary line and the like corresponds to a boundary line information acquisition unit F32.

A position such as a road edge is represented by a vehicle coordinate system, which is an XY coordinate system with a reference point of, for example, the subject vehicle as an origin. An X-axis of the vehicle coordinate system is set to be parallel to a lateral direction of the vehicle, and a positive direction of the X-axis may be set to a right direction along the lateral direction of the vehicle. A Y-axis of the vehicle coordinate system is set to be parallel to a front rear direction of the vehicle, and a positive direction of the Y-axis may be set to a forward direction along the front rear direction of the vehicle.

The coordinate system representing the position of road edge may adopt various types of coordinate systems. For example, when an image recognition software of the camera ECU 41 is configured to represent a position of detected object using a world coordinate system (WCS) or a program coordinate system (PCS) used in CAD, the relative position of the road edge may be expressed by the WCS or the PCS. The vehicle coordinate system may also be configured such that the forward direction of vehicle is set as the positive direction of X-axis and the leftward direction of the vehicle is set as the positive direction of Y-axis. The traveling road information acquisition unit F3 may acquire data representing the position of road edge and the like in the image coordinate system.

Further, the traveling road information acquisition unit F3 may convert the relative position coordinates of the lane boundary line and the like acquired from the camera ECU 41 into position coordinates (hereinafter also referred to as observation coordinates) in the global coordinate system. The observation coordinates or the lane boundary line and the like can be calculated by combining the current position coordinates of the subject vehicle and relative position information of the lane boundary line and the like with respect to the subject vehicle. When the detailed position calculation unit F5 can calculate the current position, the position information calculated by the detailed position calculation unit may be used as the current position coordinates of the vehicle used to calculate the observation coordinates of the lane boundary line and the like. When the detailed position calculation unit F5 cannot calculate the current position, the position coordinates calculated by the provisional position estimation unit F1 may be used as the current position coordinates of the vehicle. The camera ECU 41 may calculate the observation coordinates of lane boundary line and the like using the current position coordinates of the subject vehicle. Hereinafter, the lane boundary line detected by the front camera 11 is also referred to as a detected boundary line. The road edge detected by the front camera 11 is also referred to as a detected road edge.

The lane specification unit F4 is configured to specify the traveling lane in which the subject vehicle is traveling, based on the relative position information of the road edge and the lane boundary line acquired by the traveling road information acquisition unit F3. The lane specification unit F4 includes a roadside area width calculation unit F41 that calculates a width of the roadside area included in the road on which the subject vehicle is traveling. Details of the lane specification unit F4 and the roadside area width calculation unit F41 will be described later. The lane specification unit F4 may be configured to specify the traveling lane and the traveling position using the relative position information of landmarks, such as direction signboards. The lane specification unit F4 corresponds to a traveling lane specification unit.

The detailed position calculation unit F5 specifies the detailed position of subject vehicle within the traveling lane based on the specifying result of the lane specification unit F4 and the data acquired by the traveling road information acquisition unit F3. Specifically, the detailed position calculation unit F5 calculates, based on the distance to the left boundary line of traveling lane and the distance to the right boundary line of traveling lane, an offset amount in the lateral direction from the center of traveling lane. By combining the traveling lane information specified by the lane specification unit F4 and the offset amount from the center of traveling lane, a lateral position of the subject vehicle on the traveling road is specified. For example, the LTC unit H1 uses the offset amount from the center of traveling lane specified by the detailed position calculation unit F5.

In addition, the detailed position calculation unit F5 may specify the detailed vehicle position on the map based on the specification result of the lane specification unit F4 and the landmark information detected by the front camera 11. For example, when a distance from the left road edge to the vehicle center is specified as 1.75 meters as an image analysis result, it is determined that the subject vehicle is located at a position shifted by 1.75 meters to the right from the coordinates of the left road edge indicated by the map. For example, when a distance from the subject vehicle to a direction signboard located in front of the subject vehicle is specified as 100 meters as an image analysis result, it is determined that the subject vehicle is located at a position shifted by 100 meters in an oriented direction of the direction signboard from the position coordinates of the direction signboard registered in the map data. The oriented direction of the direction signboard corresponds to a direction opposite to the traveling direction of the subject vehicle. When the subject vehicle is traveling forward, the oriented direction of the direction signboard corresponds to rearward direction of the vehicle.

The landmark detected by the front camera 11 can be correlated with the landmark registered on the map by, for example, comparing the observation coordinates of landmark with the coordinate information registered on the map. For example, among the landmarks registered on the map, the landmark closest to the observation coordinates of the landmark is estimated to be the same landmark. When comparing the landmarks, it is preferable to adopt landmark with a higher matching level of the feature using feature amounts, such as shape, size, and color. When the correlation between the observed landmark and the landmark on the map is completed, the detailed position calculation unit F5 sets, as the longitudinal direction position of the subject vehicle on the map, a position that is shifted in longitudinal direction from the position of landmark on the map by the distance between the observed landmark and the subject vehicle.

As described above, according to the configuration in which the detailed position calculation unit F5 calculates the position of subject vehicle not only in the lateral direction but also in the longitudinal direction, a remaining distance to a feature point (also referred to as point of interest, POI) of the road can be calculated with high accuracy. The feature point may include an intersection, a curve entrance, a curve exit, tail end of traffic jam, road junction, or the like. By estimating the position of subject vehicle in the lateral direction, it is possible to determine whether a lane change for right or left turn purpose is necessary and the time limit of lane change if the lane change is determined to be necessary. The process of specifying the current position of subject vehicle on the map using the detected position information of landmark and road edge as described above is also referred to as localization process. The position of subject vehicle, as a result of the localization process, may be represented in the same coordinate system as the map data, such as latitude, longitude, and altitude. It is possible to represent the subject vehicle position information in any absolute coordinate system, such as world geodetic system 1984 (WGS84).

(Lane Specification Process)

Figure 4:
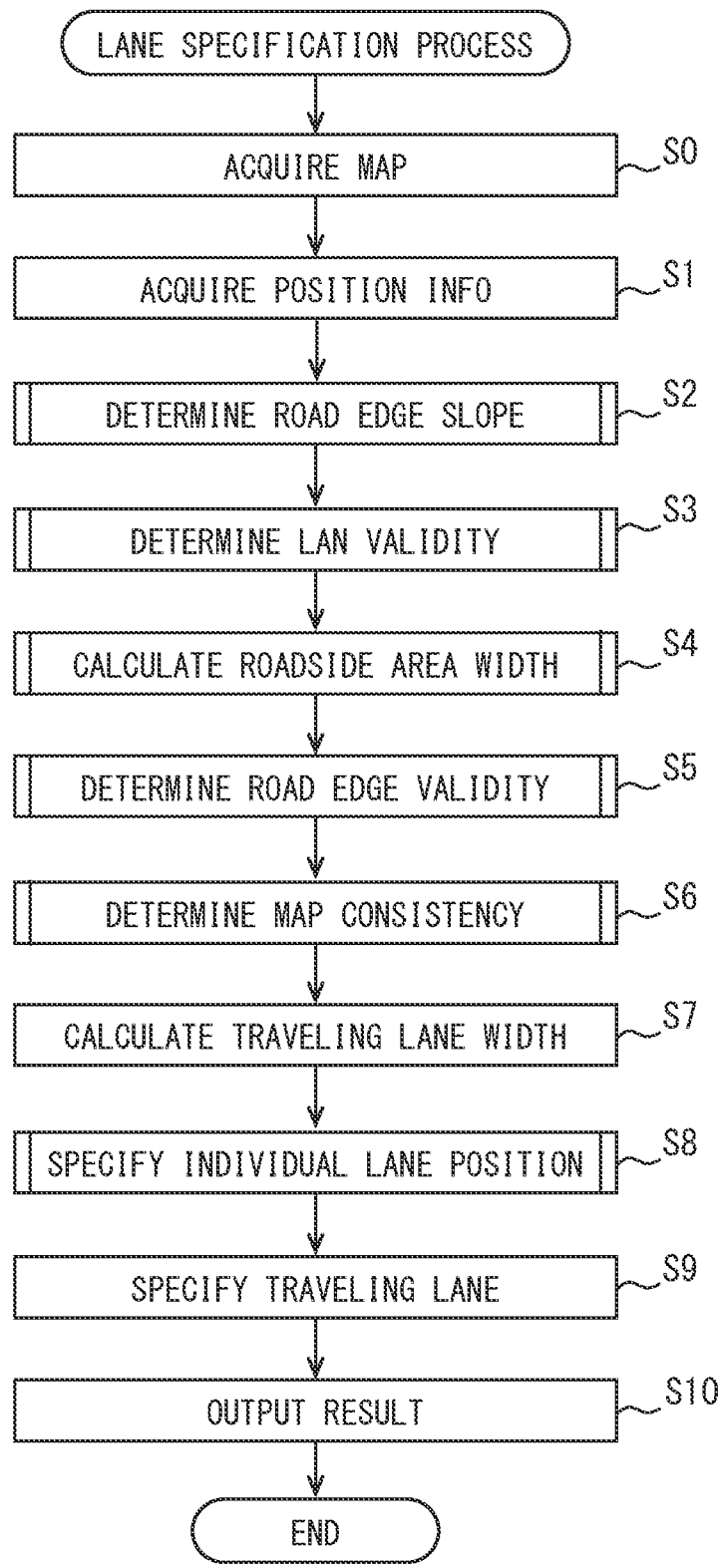
FIG. 4 is a flowchart showing a lane specifying process executed by the position estimator.

The following will describe a lane specification process executed by the position estimator 20 (mainly by the lane specification unit F4) with reference to the flowchart shown in FIG. 4. For example, processes in the flowchart shown in FIG. 4 is performed at a predetermined cycle (for example, every 100 milliseconds) during a turn-on state of a traveling power supply to the vehicle. For example, the traveling power supply is an ignition power supply in an engine vehicle. In an electric vehicle, a system main relay corresponds to the traveling power supply. In the present embodiment, the lane specification process includes S0 to S10 as an example. The lane specification unit F4 executes the process in S1 to S10. The lane specification process is repeatedly executed. When the lane specification process is successful, the vehicle position information calculated in this process is stored in the memory. The map acquisition unit F2 acquires the map data of traveling road in S0 of the lane specification process. The process in which the map acquisition unit F2 acquires the map data of traveling road may be executed independently from the process in S1 to S10 as a preliminary preparation process. The process executed in S0 corresponds to a map acquisition step.

In S1, the process calculates lateral positions (X coordinates) of various road objects, such as road edges and lane boundary lines at a determination point. The determination point is located by a predetermined distance ahead the subject vehicle. The process executed in S1 corresponds to a position acquisition step. For example, the determination point may be set at a point, which is located 10.0 meters ahead of the subject vehicle. As another example, the determination point may be set at a point, which is located 5.0 meters ahead or 8.5 meters ahead of the subject vehicle. The determination point may be set as a predetermined point included in an imaging range of the front camera 11. The determination point may include a point located a predetermined distance ahead of the subject vehicle and points existing on the left and right of the point. The determination point in the present embodiment is a linear concept. Thus, the determination point also corresponds to a determination line. For example, the process calculates the lateral position of the road edge with respect to the determination point based on the regression line parameter of the road edge.

Figure 5:
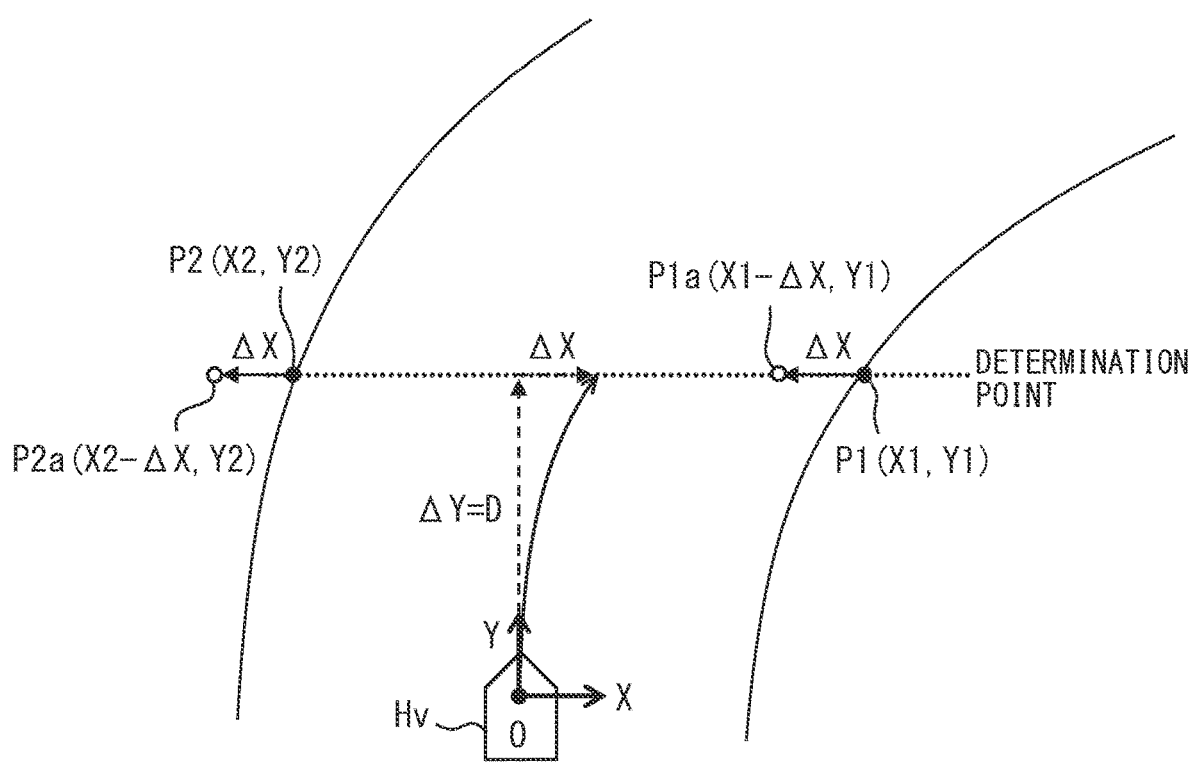
FIG. 5 is a diagram showing position correction of a detected road object using a yaw rate.

The positions of various road objects are expressed, for example, in the vehicle coordinate system defined with the subject vehicle as the reference point. As shown in FIG. 5, the lateral position (corresponding to the X coordinate) of lane boundary line or road edge at the determination point is corrected to the lateral position along the curve shape using the vehicle speed and yaw rate of the subject vehicle before being used. Specifically, using the speed and yaw rate of the subject vehicle, the process calculates the arrival time t until the subject vehicle actually arrives at the determination point. Then, the process calculates a displacement amount $\Delta X$ in the lateral direction (X-axis direction) when the subject vehicle reaches the determination point based on the arrival time to the determination point, the yaw rate, and the vehicle speed.

Specifically, when the arrival time to the determination point is t, the distance to the determination point is D, the yaw rate is $\omega$, and the vehicle speed is v, a relationship $D=(v/\omega)\sin(\omega t)$ is satisfied. The arrival time t is calculated by solving this equation. The lateral direction displacement amount $\Delta X$ can be calculated from the formula $\Delta X=(v/\omega)\{1-\cos(\omega t)\}$.

The lane specification unit F4 corrects the lateral position coordinate of road edge to the lateral position coordinate along the curve shape by subtracting $\Delta X$ from the lateral position of road edge currently detected by the front camera 11. In FIG. 5, a point P1 and a point P2 represent the position coordinates of the lane boundary lines existing on the left and right side of the subject vehicle at the determination point before correction, and a point P1a and a point P2a represent the position coordinates of the lane boundary lines after correction. By correcting the positions of the lane boundary lines and the road edges at the determination point using the yaw rate, an adverse influence of the road curvature can be suppressed. After S1 is completed, the process proceeds to S2.

In S2, the process executes road edge slope determination. The road edge slope determination process is executed to avoid, based on the slope of road edge regression line, use of information related to the road edge, which may incorrectly recognize the position, in the subsequent processing. The details of road edge slope determination process will be described later. After S2 is completed, road edge information having a certain degree of validity is obtained by excluding road edges whose positions are likely to be incorrectly recognized. After S2 is completed, the process proceeds to S3. For example, the process shown in S2 may be omitted as appropriate. By executing the process in S2, it is possible to reduce a possibility of miscalculating the width of roadside area or incorrectly specifying the traveling lane.

In S3, the process executes lane validity determination. The lane validity determination process determines whether the detected lane boundary line has a certain level of validity as a boundary line of the traveling lane. That is, the lane validity determination process removes information related to a lane boundary line, which may be incorrectly detected. From a view of confirming the validity of lane boundary line detection result, for example, the process may determine whether the lateral position of detected lane boundary line is positioned outside of the road edge position, or may determine whether a distance between left and right lane boundary lines is impossibly smaller than a general value of lane width. The details of the lane validity determination process will be described later. By executing S3, boundary line information having a certain level of validity is obtained by excluding lane boundary lines that are highly likely to be erroneously detected. After S3 is completed, the process proceeds to S4.

In S4, the roadside area width calculation unit F41 executes a roadside area width calculation process. The roadside area width calculation process calculates the width of roadside area at the determination point. The roadside area refers to an area other than the traveling lane on the road. The roadside area may include a road shoulder. For example, the roadside area may include an area sandwiched between the roadway outer line and the road edge. The roadway line refers to a division line drawn at an edge of the roadway. The roadside area may also include a zebra zone (in other words, a buffer zone) adjacent to the road edge. The zebra zone refers to a road surface area with stripped pattern. The details of the roadside area width calculation process executed in S4 will be described later. By executing S4, the calculated value of roadside area width is obtained. After S4 is completed, the process proceeds to S5.

In S5, the process executes road edge validity determination. The road edge validity determination process determines a validity of the lateral position coordinate of road edge calculated in S1. For example, when the lateral position of road edge calculated in S1 is within a lane detection range, which is a range where the existence of lane is confirmed by the front camera 11, the lateral position of road edge is determined to be incorrect, and the incorrectly calculated lateral position of road edge is discarded. The details of road edge validity determination process will be described later. The determination process executed in S5 may be included in the lane validity determination process executed in S3. As an example, the process executed in S5 may be omitted. After S5 is completed, the process proceeds to S6.

The process executes map consistency determination in S6. The map consistency determination process determines consistency between the road information obtained by the above process and the road information registered in the map. Details of the map consistency determination process will be described later. By executing the map consistency determination process, it is possible to determine whether the width of roadside area calculated in S4 is a valid value or an erroneous value. The process executed in S6 may be omitted. By executing the process in S6, it is possible to reduce a possibility of erroneous specification of traveling lane. After S6 is completed, the process proceeds to S7.

The process calculates the width of traveling lane in S7. For example, the process calculates, as the width of traveling lane, a distance from the closest lane boundary line on the right side of the vehicle to the closest lane boundary line on the left side of the vehicle. When three or more lane boundary lines are detected, the width of traveling lane may be calculated by averaging the intervals between two adjacent lane boundary lines. The process calculates, in S7, a width of traveling lane in which a different vehicle is traveling, that is, a width of a different traveling lane other than the traveling line of subject vehicle. The width of traveling lane in which the subject vehicle is traveling may be regarded as the width of different lane. By executing S7, the lane width of traveling road is determined. After S7 is completed, the process proceeds to S8.

In S8, the process executes individual lane position specification. In the individual lane position specification process, an existing range of each lane is calculated. The individual lane position specification process discards lanes that are located at incorrect positions. Details of the individual lane position specification process in S8 will be described later. After S8 is completed, the process proceeds to S9. With the above-described process, the position of each lane is determined based on the width of roadside area. Specifically, how far the first lane and the second lane are located from the road edge is determined with consideration of the width of roadside area.

In S9, the process specifies the traveling lane of subject vehicle based on the distance from the road edge to the subject vehicle and the calculated width of roadside area. Since the position of each lane is expressed in the vehicle coordinate system with respect to the subject vehicle, the lane including the point having coordinate of X=0.0 corresponds to the traveling lane of subject vehicle. For example, when the left end X coordinate of the second lane is −2.0 and the right end X coordinate of the second lane is +1.0, it is determined that the subject vehicle is traveling in the second lane. The traveling lane may be represented by a lane ID indicating the number of traveling lane when counted from the left side of the road. Since the position of each lane is determined in consideration of the width of roadside area, the above-described process corresponds to a configuration in which the lane adjacent to the roadside area is used as a reference lane (for example, as the first lane) to determine the traveling lane of subject vehicle. The lane ID may be assigned with the right side of the road as a reference. The process executed in S9 corresponds to a traveling lane specification step. After S9 is completed, the process proceeds to S10.

In S10, the process outputs information, such as the specified traveling lane and roadside area width. An output destination may include the driving assist ECU 30, the driving recording device 50, a navigation device, a map generation server provided outside of the vehicle, or the like. The output destination, such as driving assist ECU 30, the driving recording device 50, the navigation device, the map generation server, or the like corresponds to an external device.

(S2: Road Edge Slope Determination Process)

Figure 6:
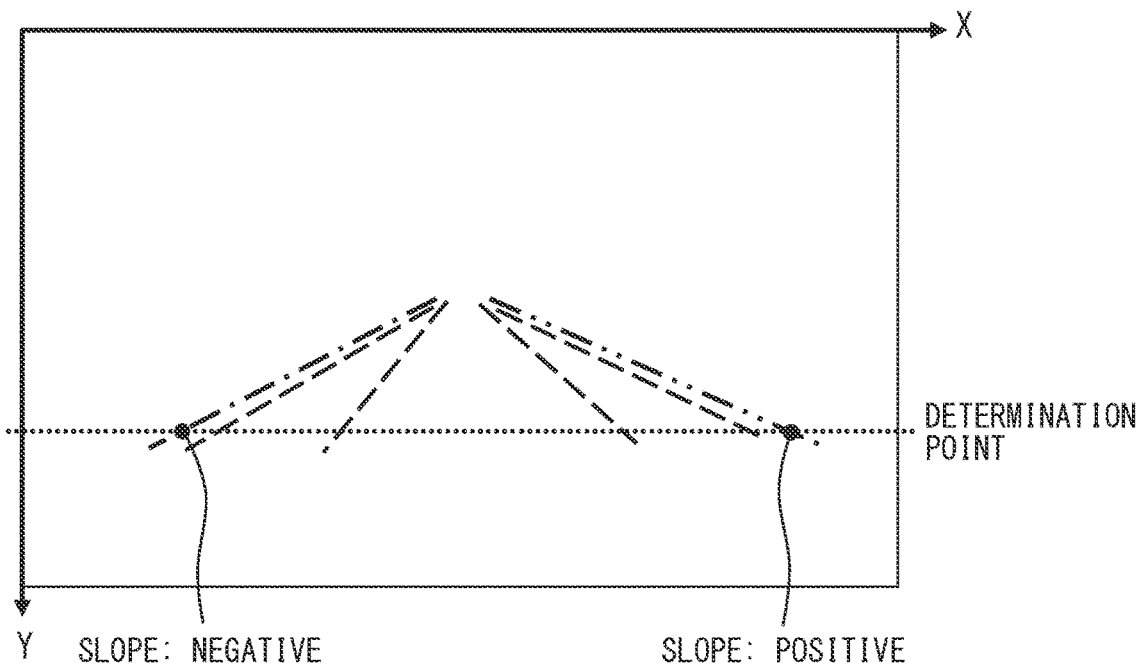
FIG. 6 is a diagram showing an slope of a roadside regression line in an image when the roadside regression line is correctly calculated.
Figure 7:
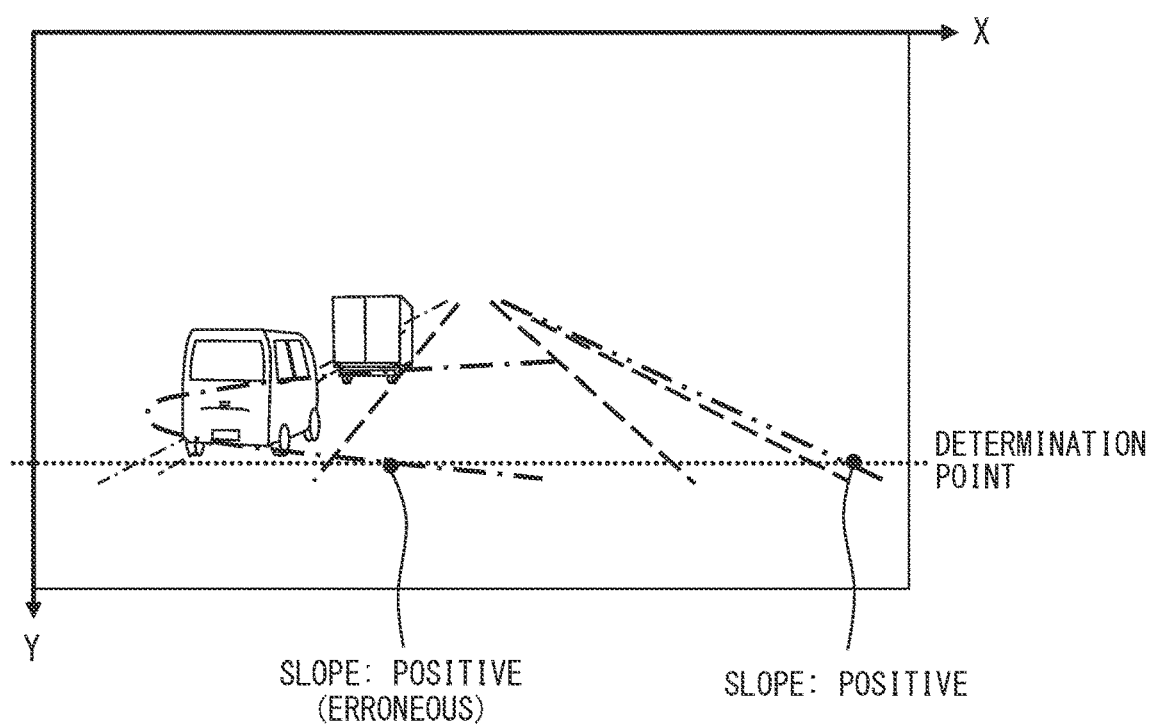
FIG. 7 is a diagram showing an slope of a left roadside regression line in an image when the left roadside regression line is erroneously calculated.

As shown in FIG. 6, in the image, the regression line of left road edge has a negative slope and the regression line of right road edge has a positive slope. When a different vehicle is captured in the image at a position close to an end of the image or close to the road edge included in the image of FIG. 7, an edge of the different vehicle may be erroneously recognized as a part of the road edger. As a result, the regression line of road edge may be greatly deviated from the actual road edge. When the regression line of road edge greatly deviates from the actual road edge, a distance between the recognized position of road edge at the determination point and the actual position of road edge is increased, thereby causing an erroneous determination of the traveling lane. In FIG. 6, dashed lines conceptually indicate lane boundary lines, the one-dot chain line conceptually indicates the regression line of left road edge, and the two-dot chain line indicates the regression line of right road edge. The elements shown in FIG. 7 are similar to those in FIG. 6, the relatively thin one-dot chain line on left side indicates the actual left road edge, and the relatively thick one-dot chain line indicates the regression line of the left road edge calculated by the camera ECU 41.

Figure 8:
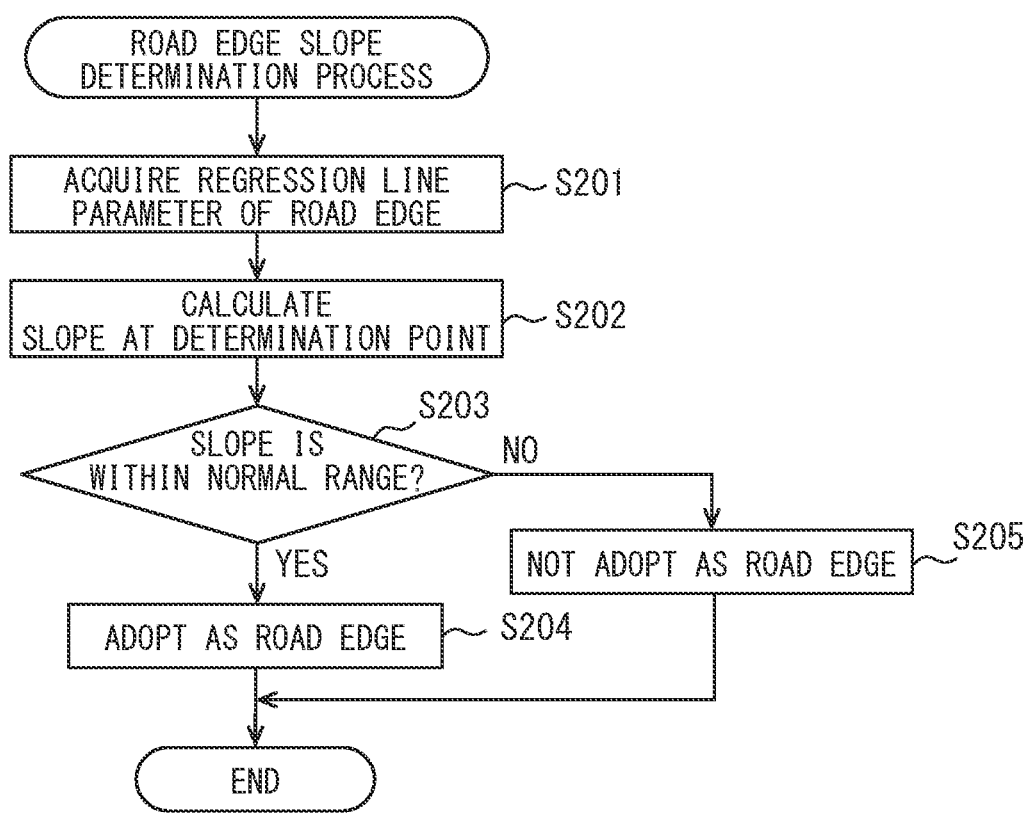
FIG. 8 is a flowchart showing a road edge slope determination process.

The road edge slope determination process is executed in view of such situation and erroneous detection. By executing the road edge slope determination process, at the determination point, when the recognition result of the slope is out of a normal range, the recognition result is discarded. The following will describe the road edge slope determination process with reference to FIG. 8. The flow shown in FIG. 8 is executed as the road edge slope determination process S2 in FIG. 4.

In the present embodiment, the road edge slope determination process includes S201 to S205 as an example. The positive or negative slope of the road edge may differ depending on a definition of the image coordinate system. The normal range of slope of each road edge may differ depending on the definition of the image coordinate system. In the following example, the upper left of the image frame is set as the origin, the rightward direction is set as the positive direction of X-axis, and the downward direction is set as the positive direction of Y-axis.

In S201, the process acquires regression line parameters of left and right road edges, and then proceeds to S202. In S202, the process calculates the slopes of left and right road edges at the determination point in the image. The process may calculate the slopes of road edges by, for example, substituting the Y-coordinate value of the determination point into the functional expression obtained by first-order differentiating of the regression line. After the slopes of the left and right road edges at the determination point in the image are calculated, that is, the slopes in the image coordinate system are calculated, the process proceeds to S203.

In S203, the process determines whether the slope of the road edge at the determination point in the image coordinate system is within a predetermined normal range. The process in S203 is executed for each of the left and right road edges. That is, the process determines whether the slope of left road edge at the determination point in the image coordinate system fall within the predetermined normal range set for left road edge. Similarly, the process determines whether the slope of right road edge at the determination point in the image coordinate system fall within the predetermined normal range set for right road edge. For example, the normal range set for the left road edge may be set to a range greater than zero. For example, the normal range set for the right road edge may be set to a range smaller than zero. Note that the normal range of slope of each road edge in the image may be dynamically adjusted in consideration of the curvature of the road stored in the map data.

When the slope of road edge in the image (that is, slope of the regression line) falls within the normal range, the recognized position of road edge is adopted as the actual position of road edge. When the slope of road edge in the image is out of the normal range, the recognized position of road edge is discarded. That is, when the slope of regression line at the determination point is determined as out of the normal range, the information of road edge is not used in the subsequent processing. As a result, it is possible to reduce the possibility of erroneous recognition of traveling lane due to erroneous recognition of road edge.

(S3: Lane Validity Determination Process)

Figure 9:
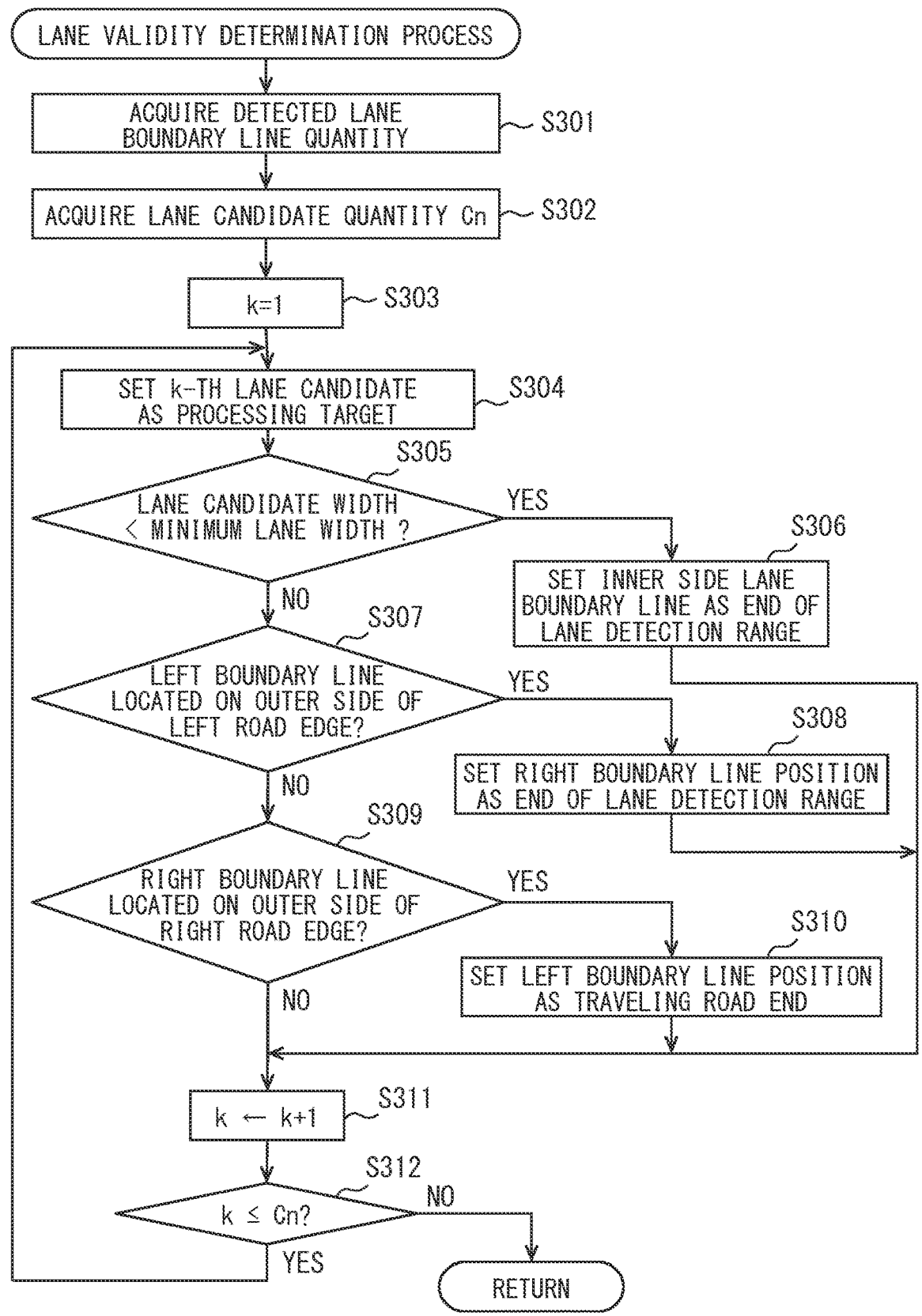
FIG. 9 is a flowchart showing a lane validity determination process.

The following will describe, with reference to FIG. 9, the lane validity determination process executed in S3 of FIG. 4. As an example, the lane validity determination process includes S301 to S311. In S301, the process acquires the number of lane boundary lines, which is detected by the front camera 11, and the process proceeds to S302. In S302, the process calculates a candidate number Cn of lanes based on the number of detected lane boundary lines acquired in S301. The lane candidate number Cn corresponds to the number of lane candidates each of which is sandwiched between detected two adjacent boundary lines. The lane candidate number Cn is a value obtained by subtracting one from the number of detected boundary lines. For example, when six lane boundary lines are detected as shown in FIG. 10, the obtained lane candidate number Cn is five.

Figure 10:
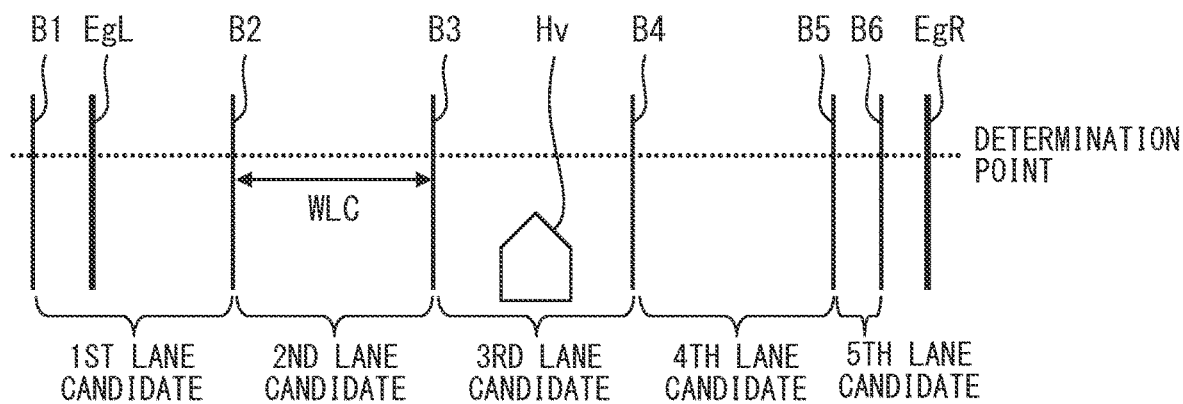
FIG. 10 is a diagram showing an operation of the lane validity determination process.

In FIG. 10 "B1" to "B6" indicate detected lane boundary lines. In FIG. 10, "EgL" indicates the left road edge, and "EgR" indicates the right road edge. In FIG. 10, "Hv" indicates the subject vehicle. Hereinafter, the i-th lane candidate counted from the left side will be referred to as the i-th lane candidate. In the example shown in FIG. 10, the subject vehicle is positioned in the third lane candidate. In the present example, the lane candidates and lane boundary number are counted and assigned from the left side of the road. As another example, the lane candidates and lane boundary number for specifying purpose may be counted and assigned from the right side of the road.

After the process in S302 is completed, the process proceeds to S303. In S303, a variable k for processing purpose is initialized (specifically, set to 1), and the process proceeds to S304. In S304, a k-th lane candidate is set as a target of subsequent processing, and the process proceeds to S305.

In S305, the process determines whether a width WLC of the k-th lane candidate is smaller than the minimum lane width LWmin. When the width WLC of k-th lane candidate is smaller than the minimum lane width LWmin, the process proceeds to S306. When the width WLC of k-th lane candidate is equal to or greater than the minimum lane width LWmin, the process proceeds to S307. When the width WLC of k-th lane candidate is smaller than the minimum lane width LWmin, it is determined that the k-th lane candidate is the roadside area but not the actual lane or the detected lane boundary line of the k-th lane candidate is an erroneously detected lane boundary line. When the width WLC of k-th lane candidate is equal to or greater than the minimum lane width LWmin, it is possible that the k-th lane candidate is an actual lane.

The minimum lane width LWmin is the minimum value of possible lane width range. The minimum lane width LWmin may be set based on laws and regulations of an area where the subject vehicle travels. For example, the minimum lane width LWmin may be set to 2.5 m. As another example, the minimum lane width LWmin may be set to 2.2 m, 2.75 m, 3.0 m, 3.5 m, or the like. In order to suppress erroneous determination, the minimum lane width LWmin used in the present process may be set to a value smaller than the actual minimum lane width defined under the laws and regulations by a predetermined amount (for example, 0.25 m). The set value of minimum lane width LWmin may be changed according to the type of road on which the subject vehicle is traveling. For example, when the vehicle is traveling on a highway, the minimum lane width LWmin may be set larger than the minimum lane width LWmin, which is set when the vehicle is traveling on a general road. According to such a configuration, since a value of the minimum lane width LWmin is set and applied corresponding to the road type where the subject vehicle is traveling, it is possible to suppress erroneous determination in which the validity of detected lane boundary line is determined.

In S306, among the two lane boundary lines of k-th lane candidate, the outer side lane boundary line is deemed to be erroneously detected. At the same time, the inner side lane boundary line of k-th lane candidate is set as an end of a lane detection range. By this configuration, a range with the inner side lane boundary line of k-th lane candidate as an outer end is determined to be the lane detection range.

For example, when the width WLC of fifth lane candidate is smaller than the minimum lane width LWmin, among the two adjacent lane boundary lines B5 and B6 of the fifth lane candidate, the lane boundary line B6 located on the outer side viewed from the subject vehicle is discarded and the lane boundary line B5 located on the inner side viewed from the subject vehicle is set as the outer end of lane detection range. By executing S305 and S306, it is possible to reduce the risk of using lane boundary line information that is highly likely to be erroneously detected in the subsequent processing. The right end of lane detection range corresponds to the right outermost lane boundary line, which is located at rightmost and effective lane boundary line among the lane boundary lines detected by the front camera 11. The effective lane boundary line is a lane boundary line used in the subsequent processing since a possibility of erroneous detection of the effective lane boundary line is low. In the determination of erroneous detection possibility, a distance to the adjacent lane boundary line and relative position to the road edge are considered. The left end of lane detection range corresponds to the left outermost lane boundary line, which is the located at leftmost and effective lane boundary line among the lane boundary lines detected by the front camera 11.

In S307, among the two lane boundary lines of k-th lane candidate, the process determines whether the left boundary line, which is the lane boundary line located on the left side, is located on outer side (in this example, on the left side) than the left road edge of road when viewed from the subject vehicle. When the left boundary line is determined to be located on outer side of the left road edge, the process proceeds to S308. When the left boundary line is determined to be not located on outer side of the left road edge, the process proceeds to S309.

In S308, among the two lane boundary lines of k-th lane candidate, the process sets the right boundary line, which is the lane boundary line located on the right side, as a left end of the lane detection range. For example, as shown in FIG. when the lane boundary line B1 corresponding to the left boundary line of the first lane candidate is located on outer side of the left road edge EgL, the detection result of the lane boundary line B1 is discarded. Then, the lane boundary line B2 is set as the left end of the lane detection range. This process corresponds to a process of determining that the detected left boundary line of k-th lane candidate is an erroneous detection result.

In S309, the process determines whether the right boundary line of k-th lane candidate is located on outer side (in this example, corresponding to right side) than the right road edge of road when viewed from the subject vehicle. When the right boundary line is determined to be located on outer side of the right road edge, the process proceeds to S310. When the right boundary line is determined to be not located on outer side of the right road edge, the process proceeds to S311. In S310, the left boundary line of k-th lane candidate is set as the right end of the lane detection range. This process corresponds to a process of determining that the detected right boundary line of k-th lane candidate is an erroneous detection result.

By executing S307 to S310, the data of lane boundary lines located outer side of the road edges are not used in the subsequent processing. The detected lane boundary line located outer side of the road edge is highly possible to be erroneously detected. By executing S307 to S310, it is possible to reduce the possibility that the lane boundary line information, which is highly possible to be erroneously detected, will be used in subsequent processing (that is, lane specification process).

In S311, the value of variable k is incremented by one, and the process proceeds to S312. In S312, the process determines whether the variable k is equal to or less than the number Cn of lane candidates. When the relationship k≤Cn is satisfied, the process returns to S304. When the relationship k>Cn is satisfied, the process ends the flow shown in FIG. 9 and proceeds to S4 shown in FIG. 4. The process executed in S312 corresponds to a process of determining whether an unprocessed lane candidate remains among all of the lane candidates. That is, the process executed in S312 corresponds to a process of determining whether the process in S304 to S310 has been executed for all of the lane candidates. In the present embodiment, an example in which the variable k is incremented from 1 to the number of lane candidates Cn is described. However, the present disclosure is not limited to this example. For example, the variable k may be decremented from the number Cn of lane candidates to 1.

Figure 11:
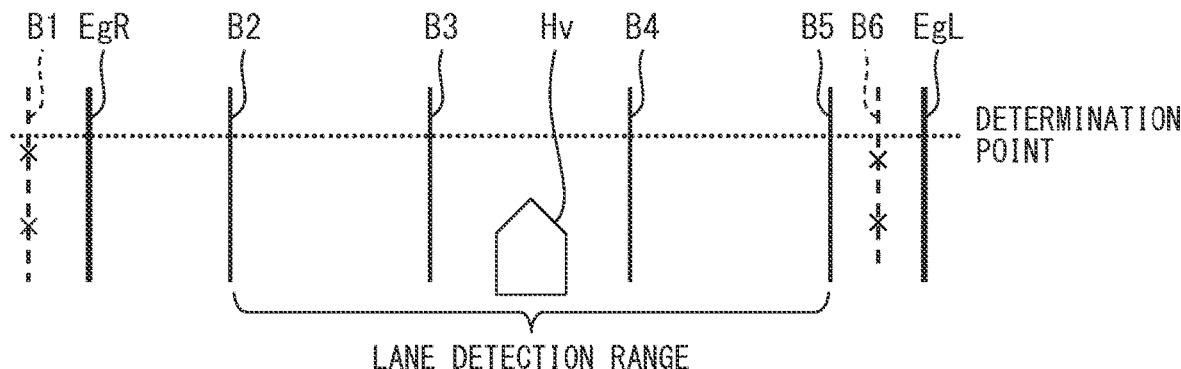
FIG. 11 is a diagram showing an operation of the lane validity determination process.

By executing the above process, for example, the detection result shown in FIG. 10 is corrected to the recognition content shown in FIG. 11. That is, by executing the above process, the information related to the lane boundary line B1 located on left side of the left road edge and the information related to the lane boundary line B6, which has a distance between itself and the adjacent lane boundary line being smaller shorter than the minimum lane width LWmin, are discarded and not used.

(S4: Roadside Area Width Calculation Process)

Figure 12:
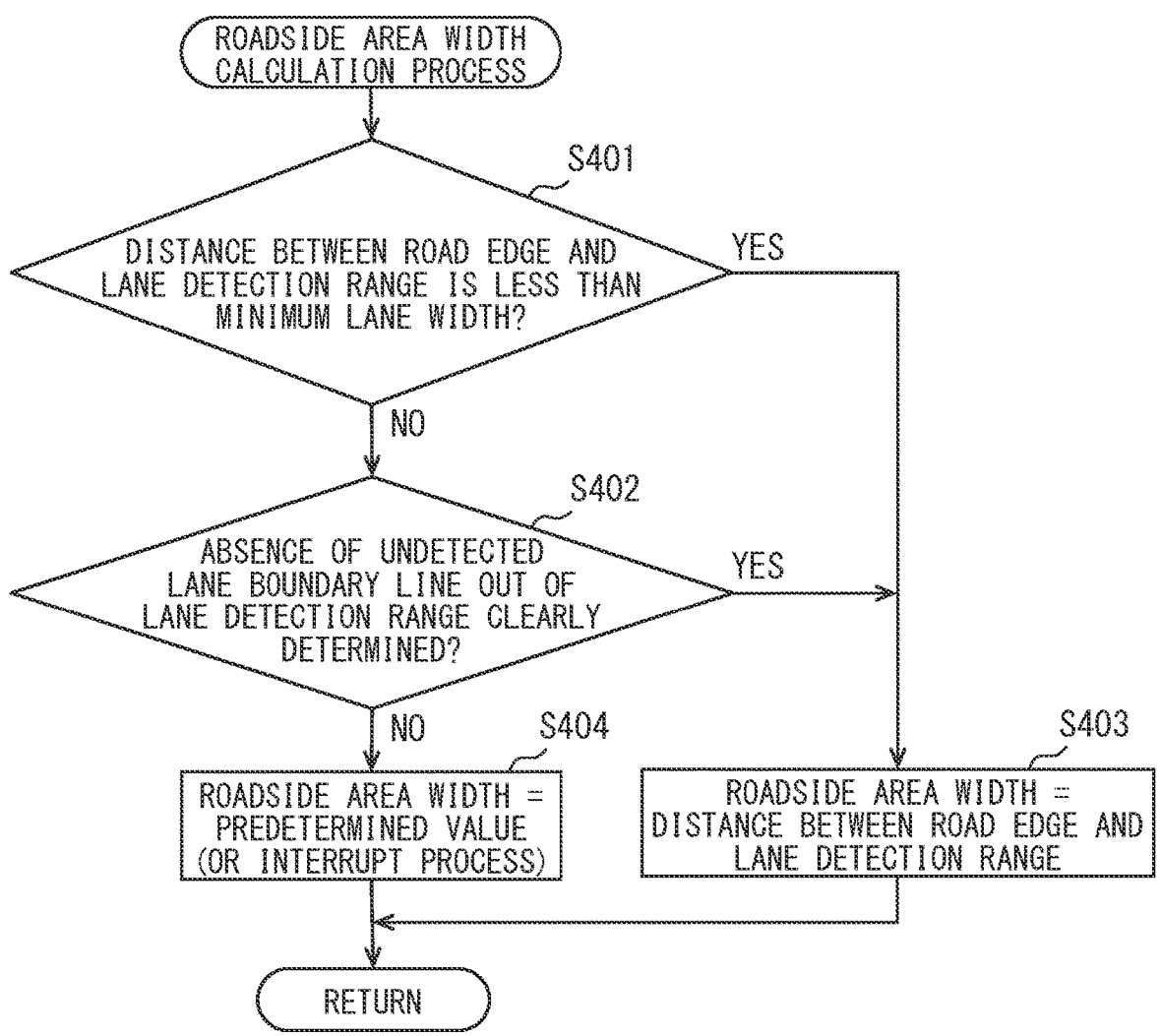
FIG. 12 is a flowchart showing a roadside area width calculation process.

The following will describe the roadside area width calculation process with reference to FIG. 12. The roadside area width calculation process shown in FIG. 12 is executed in S4 of the flow shown in FIG. 4 as an example. As an example, the roadside area width calculation process includes S401 to S404. The process executed in S401 to S404 may be individually executed for each of the right end and the left end of the lane detection range. The following example will describe the roadside area width calculation process executed for the right end of the lane detection range for simplification purpose. However, the roadside area width calculation process is also executed for the left end of the lane detection range in similar manner.

In S401, the process determines whether a distance between the right end of the lane detection range and the right edge of the road is smaller than the minimum lane width LWmin. This process is executed to determine whether the road edge is located outer side of the lane detection range by at least the minimum lane width. When the distance between the right end of the lane detection range and the right road edge is smaller than the minimum lane width LWmin, the process proceeds to S403. In a case where the distance between the right end of the lane detection range and the right road edge is smaller than the minimum lane width LWmin, it can be determined that the area between the end of lane detection range and road edge is the roadside area but not the lane. When the distance between the right end of the lane detection range and the right road edge is equal to or greater than the minimum lane width LWmin, the process proceeds to S402.

In S402, the process determines absence of undetected lane boundary line on the right side of the right end of lane detection range. For example, when the road edge is captured within a detectable range of lane by the front camera 11, or when the road surface from the lane detection range to the road edge is captured in the image, the process clearly determines in S402 that there is no undetected lane boundary line on the right side of the right end of lane detection range, and proceeds to S403. The detectable range of lane by the front camera 11 may be defined by the specification of the front camera 11, for example, a horizontal angle range corresponding to three lanes. A case where the road surface from the lane detection range to the road edge is captured by the camera may include a specific situation where no different vehicle exists on right side of the lane detection range.

When the process fails to clearly determine in S402 absence of undetected lane boundary line on the right side of the right end of lane detection range, the process proceeds to S404. A case where the process fails to clearly determine absence of undetected lane boundary line on the right side of the right end of lane detection range may include a specific situation where the road edge is located at a position distant from the detectable range of lane by the front camera 11 by one or more lanes toward the outer side of the road. The case where the process fails to clearly determine absence of undetected lane boundary line on the right side of the right end of lane detection range may also include a specific situation where partial or entire road surface from the lane detection range to the road edge cannot be captured due to an existence of the different vehicle on the right side of the lane detection range. The case where the process fails to clearly determine absence of undetected lane boundary line on the right side of the right end of lane detection range may also include a specific situation where an absence of the undetected lane boundary line on the right side of the lane detection range cannot be clearly confirmed. That is, when there is still a possibility that an undetected lane boundary line exists on the right side of the lane detection range, the process fails to clearly determine in S402 absence of undetected lane boundary line on the right side of the lane detection range, and then proceeds to S404. When there is a possibility that an undetected lane boundary line exists on the right side of the lane detection range, a detection reliability of the lane boundary line that defines the right end of the lane detection range is determined to be low, or a detection reliability of the road edge is determined to be low.

In S403, the distance from the right end of the lane detection range to the right road edge is calculated as the width of the roadside area provided on a right portion of the road. This process corresponds to a process that determines that an area from the end of the lane detection range to the road edge is a roadside area, but not a traveling lane. In S404, the width of the roadside area located on the right portion of the road is set to a predetermined value (for example, 2.5 m), and the flow shown in FIG. 12 ends. In S404, the roadside area width may be determined to be unknown and the lane specification process shown in FIG. 4 may be interrupted. When the lane specification process is interrupted, the traveling lane of subject vehicle is determined to be unknown.

By executing the above process to the road components located on the left side of the subject vehicle, that is, to the left end of the lane detection range and the left edge of the road, the width of the roadside area located at a left portion of the road can also be calculated. The roadside area width calculated by the process shown in FIG. 12 is verified in S6, and details of S6 will be described later. Thus, the roadside area width calculated by the process shown in FIG. 12 corresponds to a width of area similar to the roadside area, that is, a roadside area candidate width.

According to the above configuration, since the distance between the lane detection range and the edge of the road is calculated as the width of the roadside area, compared to a configuration in which the width of the roadside area is set to a fixed value, it is possible to set an actual value as the width of the roadside area. In a configuration where the width of roadside area is set to a fixed value, when a wide roadside area, such as an evacuation section is provided on the road, there is a significant deviation between the fixed value of the roadside area width and the actual roadside area width. In this case, the subject vehicle may erroneously specify the traveling lane. With the above-described configuration, it is possible to reduce the risk of erroneous specification of traveling lane due to the different between the fixed system use value of the roadside area width and the actual value of the roadside area width.

In the above process, when the distance between the outermost detection line, which is the recognizable outermost lane boundary line, and the road edge is smaller than the predetermined minimum lane width, the detected road edge information is used to the lane specification purpose. When the process clearly determines that is no lane boundary line between the outermost detection line and the road edge, the detected road edge information is used to the lane specification purpose. The outermost detection line is a concept that is individually applied to the left side and the right side of the vehicle. The above-described process corresponds to a process that determines an area from the outermost detection line to the road edge as the roadside area under a condition that the distance between the outermost detection line and the road edge is smaller than the predetermined minimum lane width.

(S5: Road Edge Validity Determination Process)

Figure 13:
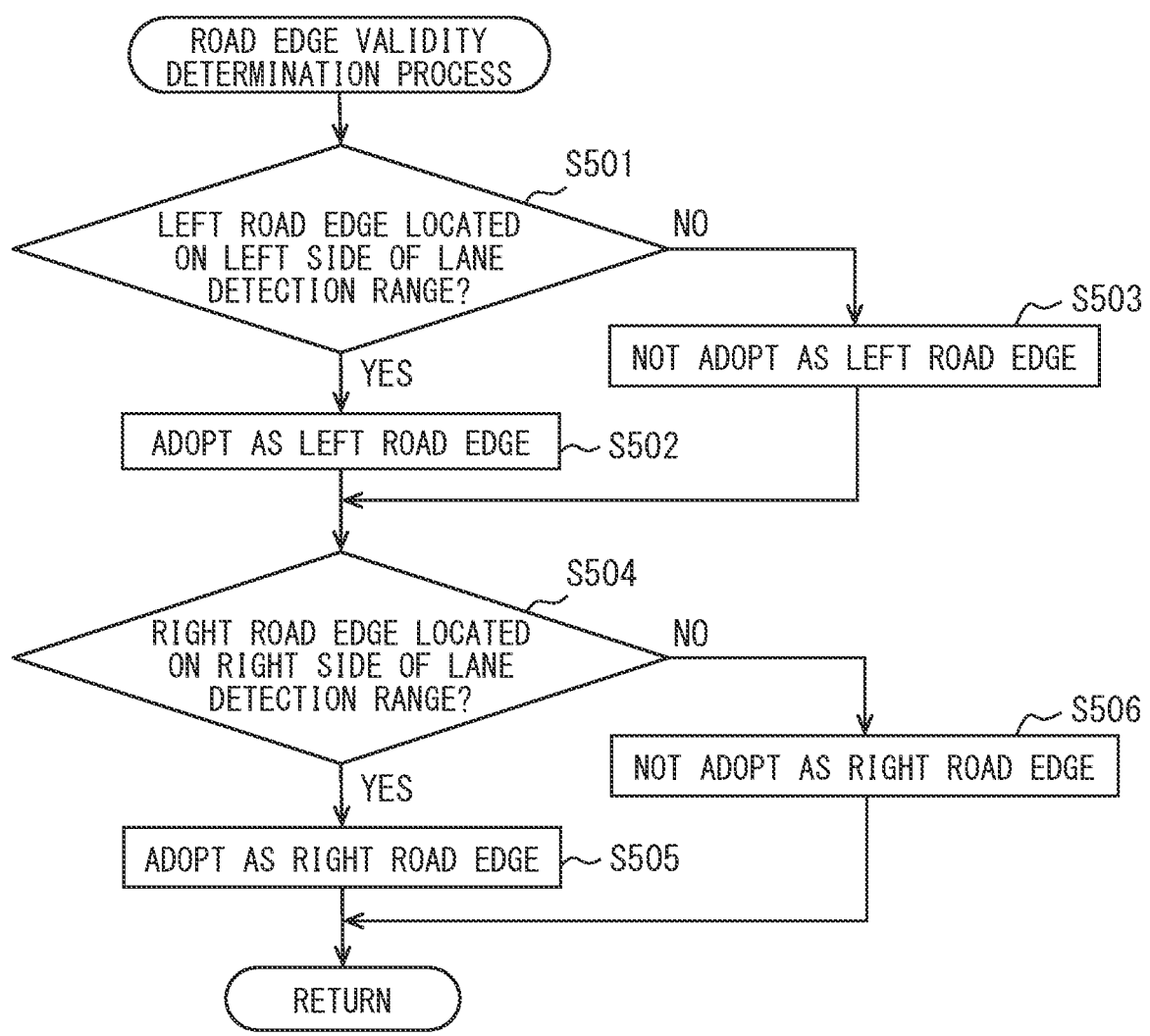
FIG. 13 is a flowchart showing a road edge validity determination process.

The following will describe the road edge validity determination process with reference to FIG. 13. This process verifies whether the lateral position of the road edge defined by the regression line of the road edge is incorrect. The road edge is not included in the lane, that is, the lane detection range. This process is executed under such a positional relationship condition, and includes S501 to S506 as an example. The flow shown in FIG. 13 is executed as the road edge validity determination process S5 in FIG. 4.

In S501, the process determines whether the estimated position of left road edge, which is defined by the regression equation corresponding to the determination point, is located on the left side of the lane detection range calculated in S3. For example, the process determines whether the lateral position of the left road edge defined based on the regression equation is located on the left side of the lateral position of the left end of the lane detection range. When the lateral position of the left road edge is located on the right side of the lateral position of the left end of the lane detection range, the process determines that the calculated position of the left road edge based on the regression equation is within the lane detection range.

When the estimated position of left road edge is located on the left side of the lane detection range, the process makes an affirmative determination in S501, and then proceeds to S502. When the estimated position of the left road edge is located on the right side of the left end of lane detection range, the process makes a negative determination in S501, and then proceeds to S503.

In S502, the estimated position of left road edge determined by the regression equation is set as the lateral position of the left road edge, and the process proceeds to S504. In S503, the estimated position of the left road edge determined by the regression equation is discarded, and the process proceeds to S504. The process in S503 corresponds to a process of determining that the calculated position of left road edge is erroneous. When S503 is executed, the position of left road edge is treated as unknown.

In S504, the process determines whether the estimated position of right road edge, which is defined by the regression equation, is located on the right side of the lane detection range calculated in S3. For example, the process determines whether the lateral position of right road edge defined based on the regression equation is located on the right side of the lateral position of the right end of the lane detection range. When the lateral position of the right road edge is located on the left side of the lateral position of the right end of the lane detection range, the process determines that the position of the right road edge estimated based on the regression equation is within the lane detection range.

When the estimated position of right road edge is located on the right side of the lane detection range, the process makes an affirmative determination in S504, and then proceeds to S505. When the estimated position of the right road edge is located on the left side of the right end of lane detection range, the process makes a negative determination in S504, and then proceeds to S506.

In S505, the estimated position of right road edge determined by the regression equation is set as the lateral position of the right road edge, and the process shown in FIG. 13 is ended. In S506, the estimated position of the right road edge determined by the regression equation is discarded, and the process shown in FIG. 13 is ended. The process in S506 corresponds to a process of determining that the calculated position of right road edge is erroneous. When S506 is executed, the position of right road edge is treated as unknown.

According to the above process, when the lateral position of road edge at the determination point determined by the regression equation is an incorrect value due to incorrectly specifying an edge of different vehicle as a part of the road edge, it is possible to detect the incorrect specification result of road edge discard the calculation result. As a result, it is possible to reduce the possibility of erroneously determining the traveling lane due to erroneous recognition of the position of road edge.

(S6: Map Consistency Determination Process)

Figure 14:
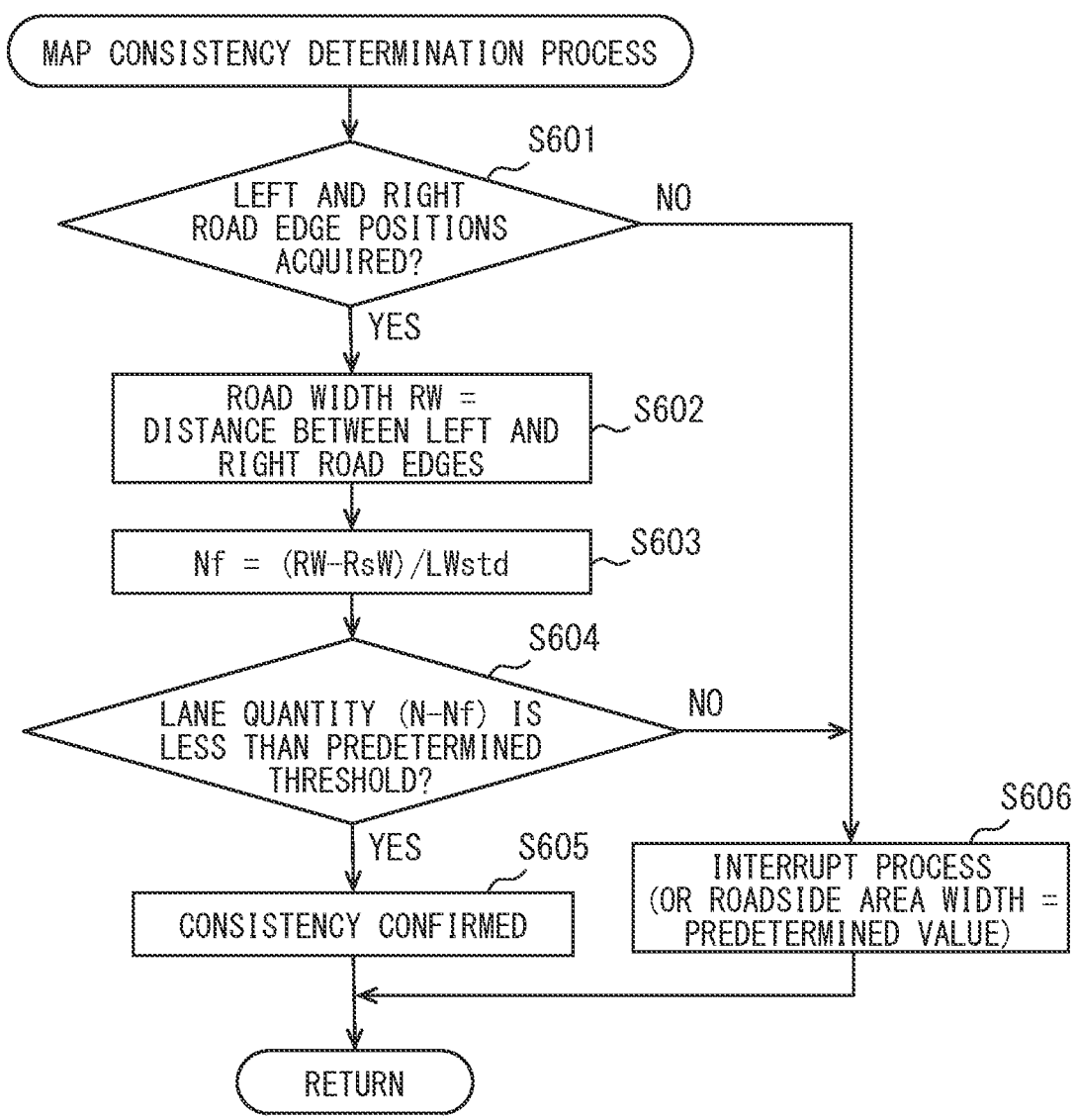
FIG. 14 is a flowchart showing a map consistency determination process.

The following will describe the map consistency determination process with reference to FIG. 14. The map consistency determination process determines whether the roadside area width, the lane detection range, road edge position calculated in the previous processes are valid by comparing the calculation results with data registered on the map. In the present embodiment, as an example, the map consistency determination process includes S601 to S606. The flow shown in FIG. 14 is executed as the map consistency determination process S6 in FIG. 4.

In S601, the process determines whether the lateral positions of the left and right road edges at the determination point are acquired. For example, in S205 of the road edge slope determination process and in S503 and S506 of the road edge validity determination process, when the position information of at least one of the left or right road edge is discarded, the process makes a negative determination in S601. When the lateral positions of both of the left and right road edges at the determination point are acquired, the process makes an affirmative determination in S601, and the process proceeds to S602. When acquisition of the lateral position of the either one of the left and right road edges at the determination point is failed, the process makes a negative determination in S601, and the process proceeds to S606.

In S602, a difference between the left and right road edges is calculated as the road width RW, and the process proceeds to S603. In S603, the process calculates an estimated lane quantity Nf, which is an estimated total number of lanes, by dividing a value, which is obtained by subtracting the calculated value RsW of the roadside area width from the road width RW calculated in S602, with a standard lane width LWstd. That is, the estimated lane quantity Nf is calculated by a formula (RW-RsW)/LWstd. The estimated lane quantity Nf is a real number and includes decimal values. The estimated lane quantity Nf can be expressed, for example, in floating point format.

The standard lane width LWstd may be set as a standard width of a traveling lane based on laws and regulations of an area where the subject vehicle travels. For example, the standard lane width LWstd may be set to 3.0 m. As another example, the standard lane width LWstd may be set to 2.5 m, 2.75 m, 3.5 m, or the like. The set value of standard lane width LWstd may be changed according to the type of road on which the subject vehicle is traveling. For example, when the vehicle is traveling on a highway, the standard lane width LWstd may be set larger than the standard lane width LWstd, which is set when the vehicle is traveling on a general road. According to such a configuration, since a value of the standard lane width LWstd is set and applied corresponding to the road type where the subject vehicle is traveling, it is possible to suppress erroneous determination in S604. After the calculation process in S603 is completed, the process proceeds to S604.

In S604, the process determines whether an absolute value of the difference between a map lane quantity Nm, which is the total number of lanes registered in the map data, and the estimated lane quantity Nf is equal to or less than a predetermined threshold. The threshold used in S604 corresponds to an upper limit of allowable error range. When the various recognition results are completely valid, a lane quantity difference, which is the difference between the map lane quantity Nm and the estimated lane quantity Nf, is zero. However, since the estimated lane quantity Nf has a decimal component, even though the front camera 11 can correctly detect road edges and lane boundary lines, the lane quantity difference may be 0.1, 0.3, or the like. The threshold of the absolute value of lane quantity difference may be set depending on how much error is allowable. For example, the threshold of lane quantity difference may be set to 0.5. As another example, the threshold of lane quantity difference may be set to 0.3, 1, or the like. When the lane quantity difference is greater than one, it means that the road width or roadside area width has a recognition error of one lane or more. Thus, the threshold of lane quantity difference is set to a value smaller than one.

When the absolute value of the lane quantity difference is less than the predetermined threshold, the process makes an affirmative determination in S604, and proceeds to S605. When the absolute value of the lane quantity difference is equal to or greater than the predetermined threshold, the process makes a negative determination in S604, and proceeds to S606. When the absolute value of lane quantity difference is equal to or greater than the predetermined threshold, a large difference may exist between the map information registered on the map and the results recognized by the position estimator 20 (that is, matching failure). For example, the results recognized by the position estimator 20 here may include at least one of the road width or the roadside area width.

In S605, the process determines that the information registered on the map matches the results recognized by the position estimator 20, and the process shown in FIG. 14 is ended. In S606, the process determines that some of the acquired data related to the road structure (for example, the calculated value of roadside area width) is incorrect, and the lane specification process shown in FIG. 4 is interrupted. When the lane specification process is interrupted, the traveling lane of subject vehicle is determined to be unknown. In S606, as another example, the process may reset the roadside area width to a predetermined value, and continue the lane specification process.

According to the above-described configuration, it is possible to determine whether the calculated value of the roadside area width and the calculated value of the road edge position are correct. For example, when the lane boundary line adjacent to the road edge cannot be detected, an area corresponding to the lane may be treated as the roadside area, and the width of the roadside area may be incorrectly calculated. With consideration of such a problem, when the calculated value of roadside area width is excessively large compared with the actual roadside area width, the lane quantity difference calculated by the above process may have a value of one or more, such as 1.5. The lane quantity difference having the value of one or more is treated as incorrect value. That is, according to the above process, an abnormality in the calculated value of the roadside area width can be detected, and error determination process can be performed.

In S606, the process may calculate a value by multiplying the map lane quantity Nm by the standard lane width LWstd as a map-based traveling area width, and calculate a value by subtracting the map-based traveling area width from the road width RW as the roadside area width RsW.

In the above-described example, the difference between the map lane quantity and the estimated lane quantity is used as an index for determining the consistency between the map related to the road structure, such as the roadside area width, and the recognition or calculation results provided by the position estimator 20. For example, a difference between (i) a recognition-based traveling area width obtained by subtracting the roadside area width RsW from the road width RW based on the recognition results and (ii) a map-based traveling area width determined based on the data registered in the map may be adopted as the determination index. The traveling area here refers to an entire range of all of the lanes included in the road. In other words, the traveling area corresponds to an area of the road excluding the roadside area and the sidewalk.

The lane specification unit F4 calculates, as the map-based roadside area width, a value by subtracting a map-based traveling area width from a road width RW. The road width RW may be calculated using the road width registered in the map or using the regression line. The difference between the roadside area width RsW calculated in the above process and the map-based roadside area width may be used as the determination index.

As another example, when the road width is registered on the map, the difference between the road width calculated in S602 and the road width registered on the map may be used as the determination index. In that case, although the validity of calculated value of the roadside area width cannot be evaluated, it is possible to determine whether the calculated result of road edge position is valid.

(S8: Individual Lane Position Specification Process)

Figure 15:
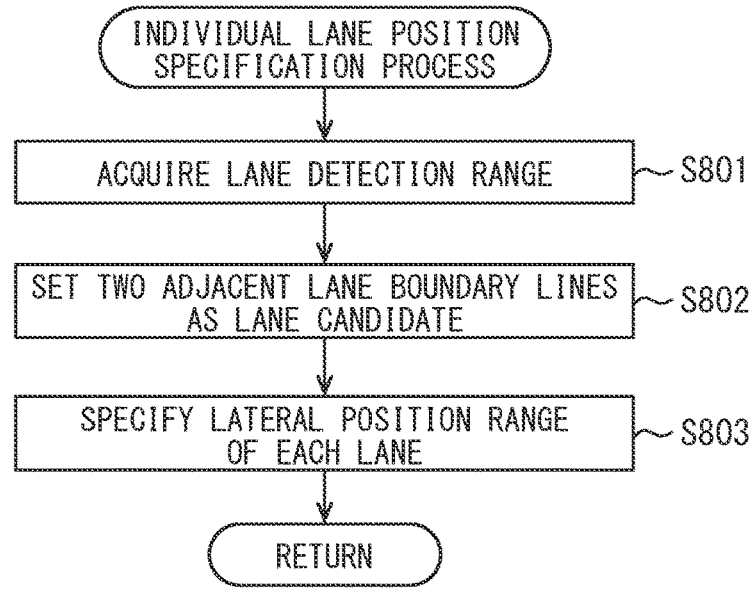
FIG. 15 is a flowchart showing an individual lane position specifying process.

The following will describe the individual lane position specification process with reference to FIG. 15. In the individual lane position specification process, a lateral position range of each detected lane is calculated. In the present embodiment, the individual lane position specification process includes S801 to S803 as an example. The flow shown in FIG. 15 is executed as the individual lane position specification process S8 in FIG. 4.

In S801, the process calculates a total lane width by multiplying the lane width by the lane quantity, and then calculates, as a road width, a value by adding the calculated roadside area width RsW to the calculated total lane width. Then, with the left road edge or right road edge as a reference, the process determines, using the calculated road width, an upper limit and a lower limit of a lateral position range (that is, X coordinate range) in which lane boundary line may exist. For example, when the road width is calculated as 15 m and the reference X coordinate of the left road edge has a value of 5 m on the left side of the vehicle, the point (X: −5.0) that is distant from the vehicle by 5.0 m on the left is set as the lower limit of lateral position of lane boundary line. Then, the X coordinate (X: +10.0) indicating a point distant from the vehicle by 10 m on the right side of the vehicle is set as the upper limit of lateral position of lane boundary line.

The road edge for which the lateral position has been calculated may be used as the reference road edge. For example, when the lateral position of right road edge has been successfully calculated and the lateral position of left road edge is unknown, the upper and lower limits of the lateral position of the lane boundary line may be calculated based on the right road edge. The case where the lateral position of the road edge is unknown may include a situation where the road edge information is discarded in the road edge validity determination process of S4, and a situation where the failure in recognition of lateral position of road edge. When the lateral positions of both of the left and right road edges are acquired, the road edge closer to the vehicle may be used as the reference road edge. This is because the position estimation accuracy of the road edge closer to the vehicle may be higher compared with the position estimation accuracy of the road edge distant from the vehicle. For example, the traveling lane width calculated in S7 may be used as the lane width in S801. The lane quantity registered on the map may be used as the lane quantity in S801. After the process in S801 is completed, the process proceeds to S802.

In S802, a set of detected boundary lines adjacent to one another is set as a lane candidate, and the process proceeds to S803. In S803, the lane candidate is specified the lane when the lateral positions (that is, the X coordinates) of the detected boundary lines on both of left and right sides within the lateral position range in which the lane boundary line may exist. As described above, the lateral position range of the lane boundary line is set in S801. Then, the process determines position coordinates of the right boundary line and the left boundary line configuring the specified lane.

As described above, the process specifies the positions of the lane boundary lines detected by the front camera 11. Thus, the process can specify the vehicle is traveling on which lane from the right or left side of the road. That is, the process can specify the lane ID of the traveling lane.

(Effects of Above-Described Configuration)

According to the above-described configuration, the traveling lane is specified based on the distance from the road edge with consideration of the actual width of roadside area. Thus, there is no necessary to use traveling locus of the different vehicle existing around the subject vehicle. Therefore, the traveling lane can be specified even when there is no different vehicle around the subject vehicle.

In the above configuration, the roadside area width is calculated based on the recognition results of the road edge and the lane boundary line, and the traveling lane is specified using the calculated value of the roadside area width. As a comparative example, the traveling lane may be specified using an appropriately designed fixed value of roadside area width. As well known, the roadside area width varies from place to place. For example, suppose that the designed fixed value of roadside area width is set to a relatively small value, such as 0.5 m. Under this setting, when the roadside area width actually has a relatively large value, such as evacuation section, the difference between the designed fixed value and the actual value of the roadside area width becomes large. As a result, an area, which actually corresponds to the roadside area, may be erroneously specified as the traveling lane, such as the first traveling lane. Alternatively, suppose that the designed fixed value of roadside area width is set to a relatively large value, such as 2.2 m. Under this setting, when the road almost has no roadside area, an area that actually corresponds to the first traveling lane may be erroneously specified as the roadside area. As a result, the traveling lane is erroneously specified. In this comparative example, the roadside area width is set to the fixed value. Since a difference between the actual roadside area width and the designed fixed value of the roadside area width, the traveling lane may be erroneously specified when the fixed value of roadside area width is used.

With consideration of the problem of the comparative example, in the present disclosure, the distance between the lateral position of lane existing area (lane detection range) and the road edge is calculated and used as the width of the roadside area. According to such a configuration, a value close to the actual roadside area width can be dynamically applied as the roadside area width used to specify the traveling lane. Thus, it becomes possible to specify the traveling lane of subject vehicle with higher accuracy than in the comparative example.

The road edges do not fade away like marked lines on the road surface. In most cases, the road edges have three-dimensional structure. Thus, even when the road has snow coverage or puddles, the road edge can also be detected with higher accuracy than the lane boundary marked on the road surface. As described above, the present embodiment specifies the traveling lane with the road edge as the reference. Compared with a configuration in which the traveling lane is specified with the lane boundary line as the reference, the configuration of the present embodiment can improve robustness.

While the embodiments of the present disclosure have been described above, the present disclosure is not limited to the embodiments described above, and various modifications to be described below are included in the technical scope of the present disclosure, and may be implemented by various modifications within a scope not departing from the spirit of the present disclosure, in addition to the modifications to be described below. For example, various modifications to be described below may be executed in combination as appropriate within a scope of the present disclosure that does not cause technical inconsistency. The components having the same functions as those described in the embodiment described above are denoted by the same reference symbols, and description of the same components will be omitted. When only a part of a configuration is described, the configuration described in the preceding embodiment can be applied the remaining part of the configuration.

(Calculation Value of Roadside Area Width)

When the calculated value RsW of roadside area width exceeds a predetermined threshold of roadside area width, the calculated value RsW of roadside area width is determined to be erroneous, and the lane specification process may be configured to be interrupted. The threshold of roadside area width may be set to a maximum possible width of the roadside area. For example, in Japan, the threshold of roadside area width may be set to 2.5 m. The threshold of roadside area width may also be set to 0.75 m, 1.5 m, or the like. The threshold of roadside area width may be set according to local laws and regulations of an area or a country where the position estimator 20 is used. The threshold of roadside area width may be changed according to the type of road on which the subject vehicle is traveling. For the highway, the threshold of roadside area width may be set to a relatively large value, such as 2.0 m. For the general roads, the threshold of roadside area width may be set to 0.75 m or 0.8 m.

Figure 16:
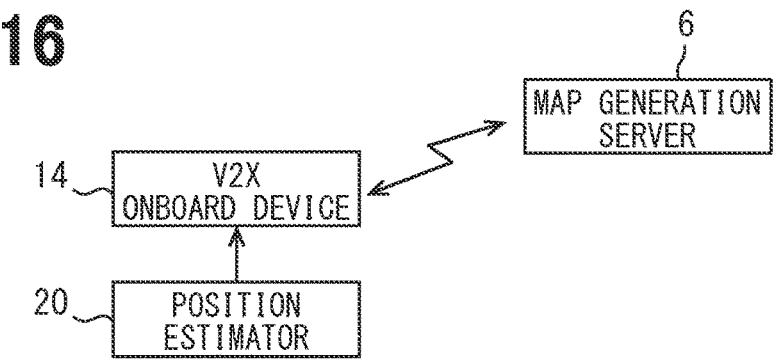
FIG. 16 is a diagram conceptually showing a system that generates a map based on data about roadside area width calculated by a vehicle.

The roadside area width calculated by the position estimator 20 may be uploaded to a map generation server 6. As shown in FIG. 16, the map generation server 6 generates and updates road map based on probe data transmitted from multiple vehicles. The V2X onboard device 14 may be configured to wirelessly transmit the roadside area width data specified by the position estimator 20 to the map generation server 6 together with the position coordinates of the determination point. With this configuration, the map generation server 6 can create a high definition map including roadside area width information based on roadside area width information uploaded from multiple vehicles. In FIG. 16, illustration of remaining parts of the driving assist system 1, such as the front camera 11 are omitted. The position estimator 20 may be configured to cooperate with the V2X onboard device 14 to upload the calculated road edge position coordinates, lane boundary line position coordinates, and the like to the map generation server 6.

The driving assist ECU 30 may use the roadside area width calculated by the position estimator 20 as follows. For example, when executing minimum risk maneuver (MRM), the driving assist ECU 30 may use the roadside area width information acquired from the position estimator 20 to determine whether there is a roadside area in front of the vehicle as a place where the vehicle can be safely stopped. For example, when the position estimator 20 notifies the driving assist ECU 30 of the presence of a roadside area having a sufficient width, the driving assist ECU 30 may create a driving plan toward the roadside area as the MRM. When the position estimator 20 notifies that there is no roadside area, the driving assist ECU 30 may create a driving plan so that the vehicle is stopped within the current traveling lane. When the driving assist ECU 30 is able to acquire the roadside area width information from the position estimator 20, the driving assist ECU can select the stop position of the subject vehicle as the MRM between currently traveling lane or the roadside area. When the stop position of the subject vehicle can be selected as the roadside area as MRM, it is possible to reduce the collision risk by a behind vehicle after the subject vehicle is stopped. As a result, the behind vehicle also has the advantage of being able to reduce the risk of coming into contact with the preceding vehicle stopped by the MRM.

(Road Edge Detection Result)

In a case where the right road edge is positioned on the right side of the rightmost lane boundary line (that is, a right outermost detection line) detected by the front camera 11 by a distant corresponding to one or more lanes, it is not clear that whether all of the area between the right outermost detection line to the right road edge corresponds to the roadside area or includes an undetected lane. Thus, when the distance from the right outermost detection line to the right road edge is equal to or greater than the minimum lane width LWmin, the right road edge may be not used as the road edge. In this case, the lane position may be specified using the opposite (that is, left) road edge. When the distance from the right outermost detection line to the right road edge is smaller than the minimum lane width LWmin, the right road edge may be used as the road edge. In this case, the right roadside area width may be set to a distance from the right outermost detection line to the right road edge. The same may be applied to a case where the left road edge is positioned on the left side of the leftmost lane boundary line (that is, a left outermost detection line) detected by the front camera 11 by a distant corresponding to one or more lanes.

(Supplement to Road Edge Detection Method)

In the present embodiment, the front camera 11 detects an end of the road surface as the road edge. For example, when the outer side of the road is an unpaved portion, the boundary between the paved portion and the unpaved portion may be detected as the road edge by analyzing the luminance distribution of the image frame (for example, by edge detection). When a roadside standing structure, which is a three-dimensional structure, such as a sidewalk level difference is formed at the edge of the road, a joint portion between the roadside standing structure and the road surface, that is, the lowest part of the standing structure may be detected as the road edge. As another example, a portion raised from the road surface may be detected as the road edge by analyzing the luminance distribution of the image frame.

Figure 17:
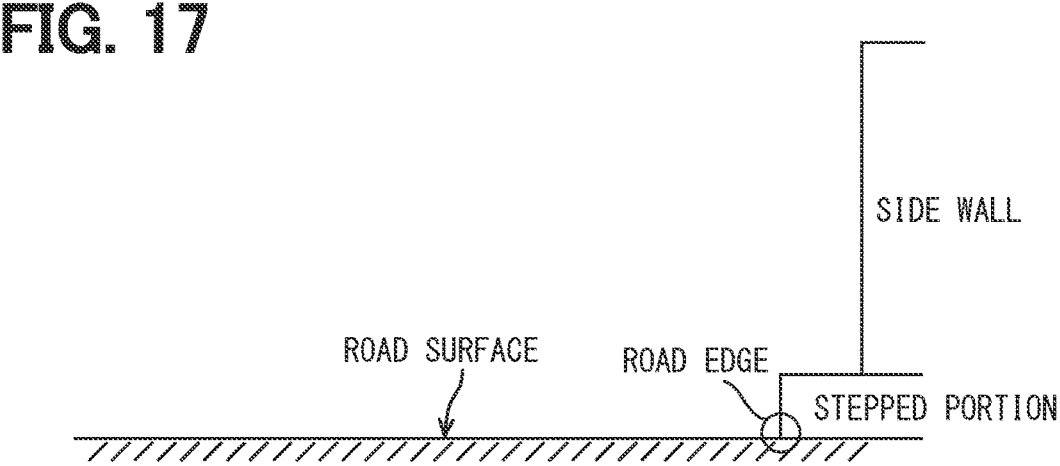
FIG. 17 is a diagram showing a structure of road portion detected as the road edge.

The configuration in which the boundary between the road surface and the roadside standing structure raised from the road surface is detected as the road edge can provide the following effects. Usually, as shown in FIG. 17, a side wall along an expressway is sometimes positioned outside of a stepped portion raised by several tens of centimeters from the road surface. When the position of side wall is adopted as the road edge, there is a risk that the portion where the stepped portion is arranged may be erroneously recognized as an area where the vehicle can travel. As a result, there is a risk that the tire or body of vehicle may come into contact with the stepped portion. With consideration of such an assumed structure, when the end of road surface is adopted as the road edge as in the present embodiment, the risk of occurrence of above problem can be reduced. As another example, the position estimator 20 may be configured to use the positions of side walls, guardrails, etc. as road edge positions.

(Usage of Traveling Lane Information)

The lane ID of traveling lane specified by the position estimator 20 is essential information when performing autonomous driving including lane changes. For example, the driving assist ECU 30 as an autonomous driving device may be configured to generate a driving plan including a lane change based on the lane ID of the traveling lane specified by the position estimator 20. The road on which the autonomous driving is possible may be defined in unit of lanes as an operational design domain (ODD). Under such restrictions, the autonomous driving system needs to accurately specify whether the subject vehicle is in a traveling lane where the autonomous driving is possible. For example, in response to determining that the subject vehicle is not in a lane where the autonomous driving is possible or the subject vehicle being required to move to a lane where the autonomous driving is not permitted, the driving authority is changed to the driver's seat occupant or operator or execution of MRM is activated as a system response. The configuration of the present disclosure can also be useful for such situation since it has high robustness against the driving environment.

In the HMI system including a navigation device, there is a demand for displaying turn-by-turn information, facility guide information, and the like on a head-up display in a manner that matches the real world. When the recognition of traveling lane of subject vehicle deviates from the actually traveling lane even by one lane, a significant difference may be generated between the display image on the head-up display and the real world. That is, there is a demand for a configuration that can accurately specify the traveling lane of subject vehicle not only in the technical field of autonomous driving but also in the technical field of navigation. The configuration of the present disclosure can be useful also for such a demand.

(Supplement to System Configuration)

Figure 18:
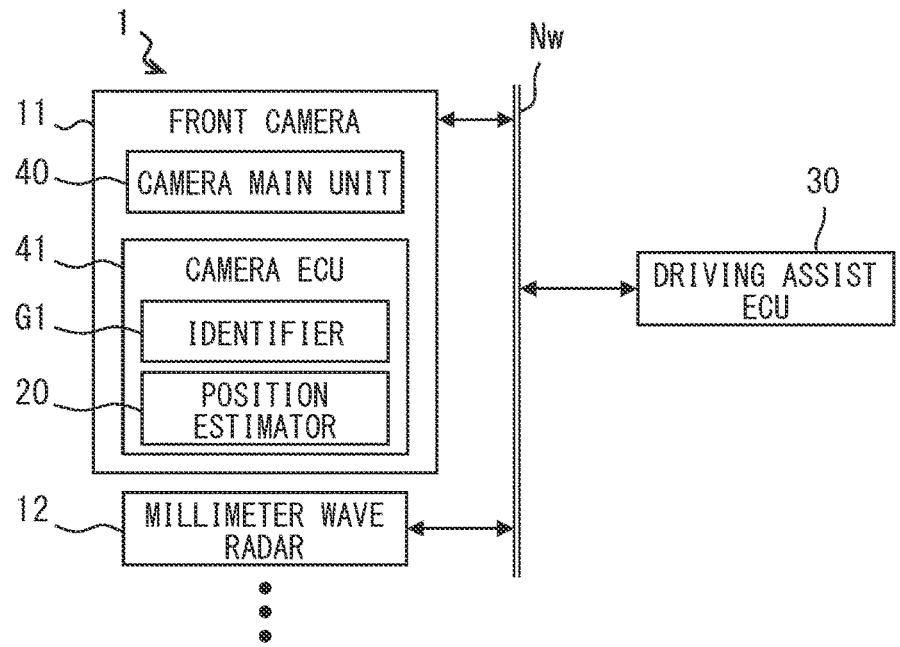
FIG. 18 is a diagram showing a modification of a system configuration.
Figure 19:
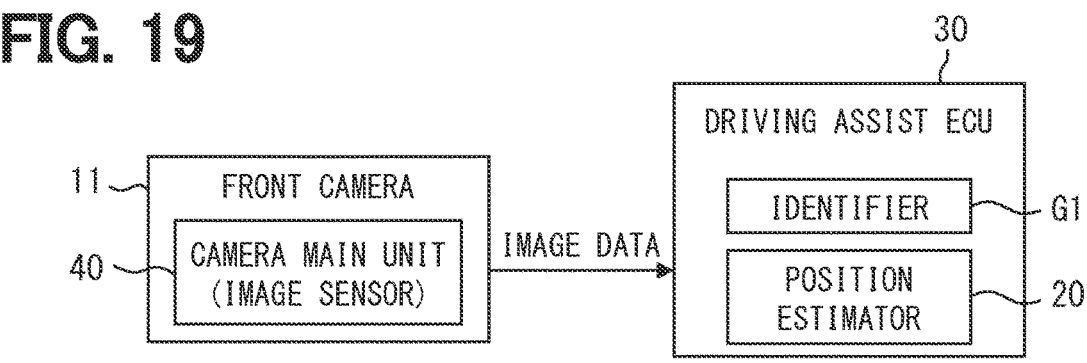
FIG. 19 is a diagram showing a modification of a system configuration.

The configuration in which the position estimator 20 is disposed outside the front camera 11 is exemplified in the above-described embodiment. The disposition of the position estimator 20 is not limited thereto. As shown in FIG. 18, the function of position estimator 20 may be included in the camera ECU 41. As shown in FIG. 19, the function of the position estimator 20 may be included in the driving assist ECU 30. The driving assist ECU 30 including the function of position estimator 20 corresponds to a traveling control device. The function of the camera ECU 41 (mainly the identifier G1) may also be included in the driving assist ECU 30. That is, the front camera 11 may be configured to output the image data to the driving assist ECU 30, and the driving assist ECU 30 may be configured to execute a process such as the image recognition. In FIG. 18 and FIG. 19, illustration of remaining parts of the driving assist system 1 are omitted.

Figure 20:
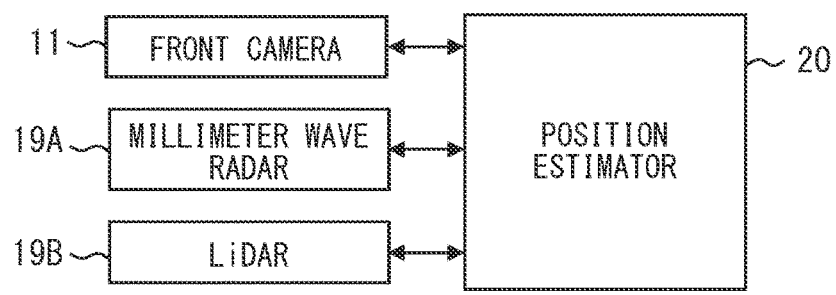
FIG. 20 is a diagram showing an example of a device that can be used for road edge detection.

In the above configuration, the position estimator 20 detects the position of road edge relative to the subject vehicle using the front camera 11. However, the present disclosure is not limited to this configuration. As shown in FIG. 20, a millimeter wave radar 19A, a light detection and ranging/laser imaging detection and ranging (LiDAR) 19B, a sonar, or the like may detect the position of road edge relative to the subject vehicle. The millimeter wave radar 19A, the LiDAR 19B, and the sonar correspond to a distance measuring sensor. In another example, a side camera that captures a lateral direction view of the subject vehicle or a rear camera that captures a rear direction view of the subject vehicle may be used to detect the road edge and the lane boundary line. The front camera 11, the side camera, and the rear camera correspond to an imaging device. The position estimator 20 may be configured to detect road edges and the like using multiple types of devices. That is, the position estimator 20 may determine the positions of road edges and lane boundary lines by sensor fusion. For the position of the road edge, the position recognized by the recognition software may be used instead of calculating the positing using the regression line.

(Additional Note 1)

The control units and methods thereof described in the present disclosure may be implemented by a special purpose computer which includes a processor programmed to execute one or more functions implemented by computer programs. The device and the method thereof described in the present disclosure may be implemented by a dedicated hardware logic circuit. Further, the device and the method thereof described in the present disclosure may be implemented by one or more dedicated computers configured by a combination of a processor that executes a computer program and one or more hardware logic circuits. The computer program may be stored in a computer readable non-transitory tangible storage medium as computer-executable instructions. For example, the means and/or the functions which are provided by the position estimator 20 may be provided by software stored in tangible memory devices and computers for executing them, only software, only hardware, or a combination thereof. A part or all of the functions of the position estimator 20 may be implemented by hardware. A configuration in which a certain function is implemented by hardware includes a configuration in which the function is implemented by use of one or more ICs or the like. The processing unit 21 may be implemented by using an MPU, a GPU, or a data flow processor (DFP) instead of the CPU. The processing unit 21 may be implemented by combining multiple types of calculation processing devices such as a CPU, an MPU, and a GPU. The ECU may be implemented by using a field-programmable gate array (FPGA) or an application specific integrated circuit (ASIC). The various programs described above may be stored in a non-transitory tangible storage medium. As the storage medium of the programs, various storage media, such as a hard-disk drive (HDD), a solid state drive (SSD), an erasable programmable rom (EPROM), a flash memory, a USB memory, and a secure digital (SD) memory card may be used.

(Additional Note 2)

The present disclosure also includes the following configurations.

(Configuration 1)

A roadside area recognition device includes:

a boundary line information acquisition unit (F32) that acquires position information of lane boundary lines detected by analyzing an image captured by an imaging device (11), the imaging device capturing a periphery environment of a subject vehicle;

a road edge information acquisition unit (F31) that acquires position information of a road edge relative to the subject vehicle using at least one of the imaging device or a distance measuring sensor (19A, 19B), the distance measuring sensor detecting an object existing in a predetermined direction relative to the subject vehicle by transmitting a probe wave or a laser beam; and a roadside area width calculation unit (F41) calculating a lateral direction distance between an outermost detection line, which is an outermost boundary line among the detected boundary lines, and the road edge as a roadside area candidate width, wherein an area from the outermost detection line to the road edge is determined as a roadside area under a condition that the roadside area candidate width is less than a predetermined value.

Usually, a width of roadside area (also known as a road shoulder) varies according to the road section or road type. Thus, it is difficult to distinguish the roadside area from the traveling lane. According to the above configuration, it is possible to accurately recognize the roadside area. As an assumed configuration for recognizing the roadside area, a line type (solid line or dashed line) of the lane boundary line may be used to determine whether the outer side of the lane boundary line corresponds to the roadside area or not. However, when the lane boundary line is a solid line or a dashed line, the outer side of the lane boundary line is not always the roadside area. That is, in the assumed configuration, there is a risk of erroneous determination of the roadside area.

With consideration of the problem potentially existing in the assumed configuration, the above-described configuration 1 of the present disclosure determines whether the area between the road edge and the detected lane boundary line corresponds to the roadside area based on the distance from the road edge to the detected lane boundary line. Thus, it is possible to reduce the possibility of erroneous determination of the roadside area.

(Configuration 2)

The roadside area recognition device according to the above configuration 1, wherein the calculated roadside area width is configured to be transmitted to an autonomous driving device.

(Configuration 3)

The roadside area recognition device according to the above configuration 1, further comprising a subject vehicle position acquiring unit (F1, F5) acquiring a position of the subject vehicle, wherein information indicating the calculated roadside area width is configured to be transmitted, together with position information of the subject vehicle, to a map generation server disposed outside of the subject vehicle.

(Configuration 4)

A roadside area recognition method includes:

acquiring position information of lane boundary lines detected by analyzing an image generated by an imaging device (11), the imaging device capturing a periphery environment of a subject vehicle;

acquiring (S1) position information of a road edge relative to the subject vehicle using at least one of the imaging device or a distance measuring sensor (19A, 19B), the distance measuring sensor detecting an object existing in a predetermined direction relative to the subject vehicle by transmitting a probe wave or a laser beam; and calculating (S4) a lateral direction distance between an outermost detection line, which is an outermost boundary line among the detected boundary lines, and the road edge as a roadside area candidate width; and determining an area from the outermost detection line to the road edge as a roadside area under a condition that the roadside area candidate width is less than a predetermined value.

(Configuration 5)

A roadside area recognition device includes:

a boundary line information acquisition unit (F32) that acquires position information of lane boundary lines detected by analyzing an image generated by an imaging device (11), the imaging device capturing external views viewed from a subject vehicle;

a road edge information acquisition unit (F31) that acquires position information of a road edge relative to the subject vehicle using at least one of the imaging device or a distance measuring sensor (19A, 19B), the distance measuring sensor detecting an object existing in a predetermined direction relative to the subject vehicle by transmitting a probe wave or a laser beam;

a roadside area width calculation unit (F41) calculating a lateral direction distance between an outermost detection line, which is an outermost boundary line among the detected boundary lines, and the road edge as a roadside area width;

a map acquisition unit (F2) acquiring map information including a lane quantity of traveling road of the subject vehicle from a map storage disposed inside or outside of the subject vehicle; and a traveling lane specification unit (F4) specifying a traveling lane of the subject vehicle based on (i) the position information of the road edge acquired by the road edge information acquisition unit, (ii) the lane quantity included in the map information acquired by the map acquisition unit, and (iii) the roadside area width calculated by the roadside area width calculation unit, wherein information of the traveling lane specified by the traveling lane specification unit is output to a predetermined driving recording device.

What is claimed is:

1. A vehicle position estimation device comprising:
    a road edge information acquisition unit acquiring a distance from a subject vehicle to a road edge using at least one of an imaging device or a distance measuring sensor, the imaging device capturing images of a predetermined range around the subject vehicle, the distance measuring sensor detecting an object existing in a predetermined direction relative to the subject vehicle by transmitting a probe wave or a laser beam;

a map acquisition unit acquiring map information including a lane quantity of a traveling road of the subject vehicle from a map storage disposed inside or outside of the subject vehicle;

a boundary line information acquisition unit acquiring position information of lane boundary lines detected by analyzing the images captured by the imaging device;

a roadside area width calculation unit calculating, as a roadside area width, a lateral direction distance between an outermost detection line, which is an outermost boundary line among the detected boundary lines, and the road edge; and a traveling lane specification unit specifying a traveling lane of the subject vehicle, in which the subject vehicle is traveling, based on (i) the distance from the subject vehicle to the road edge, (ii) the roadside area width, and (iii) the lane quantity included in the map information acquired by the map acquisition unit, wherein, when the traveling lane specification unit acquires position information of both of a left road edge located on a left side of the subject vehicle and a right road edge located on a right side of the subject vehicle as the road edge, the traveling lane specification unit calculates an estimated lane quantity, which is an estimated value of the lane quantity, using (i) a distance between the left road edge and the right road edge and (ii) the roadside area width, and when a difference between a lane quantity included in the map information and the estimated lane quantity is equal to or greater than a predetermined threshold, the traveling lane specification unit determines the calculated roadside area width as an erroneous result or interrupts specifying of the traveling lane of the subject vehicle.

2. The vehicle position estimation device according to claim 1, wherein the traveling lane specification unit determines an area from the outermost detection line to the road edge as a roadside area under a condition that the calculated roadside area width is less than a predetermined threshold, and the traveling lane specification unit specifies the traveling lane of the subject vehicle with a traveling lane adjacent to the roadside area as a reference.

3. The vehicle position estimation device according to claim 1, wherein, in specifying of the traveling lane of the subject vehicle, the traveling lane specification unit does not use position information of a lane boundary line, which is detected on outer side of the road edge.

4. The vehicle position estimation device according to claim 1, wherein, in specifying of the traveling lane of the subject vehicle, the traveling lane specification unit does not use position information of a lane boundary line, which is one of two adjacent lane boundary lines and located outer side with respect to the subject vehicle, when a distance between the two adjacent lane boundary lines is smaller than a predetermined minimum lane width.

5. The vehicle position estimation device according to claim 1, wherein the traveling lane specification unit specifies, based on the position information of the detected lane boundary lines, a lane detection range in which at least one traveling lane exists, and when the position information of the road edge acquired by the road edge information acquisition unit indicates that the road edge is located on an inner side of the lane detection range, the traveling lane specification unit (i) determines the position information of the road edge as an erroneous result, (ii) does not use the position information of the road edge in specifying of the traveling lane of the subject vehicle, or (iii) interrupts the specifying of the traveling lane of the subject vehicle.

6. The vehicle position estimation device according to claim 1, wherein the roadside area width calculation unit uploads data related to the calculated roadside area width to a map generation server.

7. The vehicle position estimation device according to claim 1, wherein the road edge information acquisition unit specifies a road edge slope at a predetermined determination point in the image captured by the imaging device using a road edge regression line generated by detection points of the road edge as population, and when the road edge slope is out of a predetermined normal range, the traveling lane specification unit (i) determines a recognition result of the road edge as an erroneous result, (ii) does not use the recognition result of the road edge in specifying of the traveling lane of the subject vehicle, or (iii) interrupts the specifying of the traveling lane of the subject vehicle.

8. The vehicle position estimation device according to claim 1, wherein, when the traveling lane specification unit successfully specifies the traveling lane, a lane number assigned to the specified traveling lane is output to an external device.

9. A traveling position estimation method executed by at least one processor for specifying a traveling lane in which a subject vehicle is traveling, the traveling position estimation method comprising:

acquiring a distance from a road edge to a subject vehicle using at least one of an imaging device or a distance measuring sensor, the imaging device capturing images of a predetermined range around the subject vehicle, the distance measuring sensor detecting an object existing in a predetermined direction relative to the subject vehicle by transmitting a probe wave or a laser beam;

acquiring position information of lane boundary lines detected by analyzing the images captured by the imaging device;

acquiring map information including a lane quantity of a traveling road of the subject vehicle from a map storage disposed inside or outside of the subject vehicle;

calculating, as a roadside area width, a lateral direction distance between an outermost detection line, which is an outermost boundary line among the detected boundary lines, and the road edge; and specifying a traveling lane of the subject vehicle, in which the subject vehicle is traveling, based on (i) the distance from the road edge to the subject vehicle, (ii) the roadside area width, and (iii) the lane quantity included in the acquired map information wherein, for a state in which position information of both of a left road edge located on a left side of the subject vehicle and a right road edge located on a right side of the subject vehicle is acquired as the road edge, an estimated lane quantity, which is an estimated value of the lane quantity, is calculated using (i) a distance between the left road edge and the right road edge and (ii) the roadside area width, and for a state in which a difference between a lane quantity included in the map information and the estimated lane quantity is equal to or greater than a predetermined threshold, the calculated roadside area width is determined as an erroneous result or specifying of the traveling lane of the subject vehicle is interruped.

10. A parking assistance apparatus that assists a parking of a vehicle, the parking assistance apparatus comprising:
a computer-readable non-transitory storage medium; and
a microcomputer, by executing a program stored in the computer-readable non-transitory storage, configured to:
   acquire a distance from a road edge to a subject vehicle using at least one of an imaging device or a distance measuring sensor, the imaging device capturing images of a predetermined range around the subject vehicle, the distance measuring sensor detecting an object existing in a predetermined direction relative to the subject vehicle by transmitting a probe wave or a laser beam;
   acquire position information of lane boundary lines detected by analyzing the images captured by the imaging device;
   acquire map information including a lane quantity of a traveling road of the subject vehicle from a map storage disposed inside or outside of the subject vehicle;
   calculate, as a roadside area width, a lateral direction distance between an outermost detection line, which is an outermost boundary line among the detected boundary lines, and the road edge; and
   specify a traveling lane of the subject vehicle, in which the subject vehicle is traveling, based on (i) the distance from the road edge to the subject vehicle, (ii) the roadside area width, and (iii) the lane quantity included in the acquired map information, wherein,
when position information of both of a left road edge located on a left side of the subject vehicle and a right road edge located on a right side of the subject vehicle is acquired as the road edge, an estimated lane quantity, which is an estimated value of the lane quantity, is calculated using (i) a distance between the left road edge and the right road edge and (ii) the roadside area width, and
when a difference between a lane quantity included in the map information and the estimated lane quantity is equal to or greater than a predetermined threshold, the calculated roadside area width is determined as an erroneous result or specifying of the traveling lane of the subject vehicle is interrupted.

11. A vehicle position estimation device comprising:
a road edge information acquisition unit acquiring a distance from a subject vehicle to a road edge using at least one of an imaging device or a distance measuring sensor, the imaging device capturing images of a predetermined range around the subject vehicle, the distance measuring sensor detecting an object existing in a predetermined direction relative to the subject vehicle by transmitting a probe wave or a laser beam;
a map acquisition unit acquiring map information including a lane quantity of a traveling road of the subject vehicle from a map storage disposed inside or outside of the subject vehicle;
a boundary line information acquisition unit acquiring position information of lane boundary lines detected by analyzing the images captured by the imaging device;
a roadside area width calculation unit calculating, as a roadside area width, a lateral direction distance between an outermost detection line, which is an outermost boundary line among the detected boundary lines, and the road edge; and
a traveling lane specification unit specifying a traveling lane of the subject vehicle, in which the subject vehicle is traveling, based on (i) the distance from the subject vehicle to the road edge, (ii) the roadside area width, and (iii) the lane quantity included in the map information acquired by the map acquisition unit,
wherein
the traveling lane specification unit specifies, based on the position information of the detected lane boundary lines, a lane detection range in which at least one traveling lane exists, and
when the position information of the road edge acquired by the road edge information acquisition unit indicates that the road edge is located on an inner side of the lane detection range, the traveling lane specification unit (i) determines the position information of the road edge as an erroneous result, (ii) does not use the position information of the road edge in specifying of the traveling lane of the subject vehicle, or (iii) interrupts the specifying of the traveling lane of the subject vehicle.

12. A vehicle position estimation device comprising:
a road edge information acquisition unit acquiring a distance from a subject vehicle to a road edge using at least one of an imaging device or a distance measuring sensor, the imaging device capturing images of a predetermined range around the subject vehicle, the distance measuring sensor detecting an object existing in a predetermined direction relative to the subject vehicle by transmitting a probe wave or a laser beam;
a map acquisition unit acquiring map information including a lane quantity of a traveling road of the subject vehicle from a map storage disposed inside or outside of the subject vehicle;
a boundary line information acquisition unit acquiring position information of lane boundary lines detected by analyzing the images captured by the imaging device;
a roadside area width calculation unit calculating, as a roadside area width, a lateral direction distance between an outermost detection line, which is an outermost boundary line among the detected boundary lines, and the road edge; and
a traveling lane specification unit specifying a traveling lane of the subject vehicle, in which the subject vehicle is traveling, based on (i) the distance from the subject vehicle to the road edge, (ii) the roadside area width, and (iii) the lane quantity included in the map information acquired by the map acquisition unit,
wherein
the road edge information acquisition unit specifies a road edge slope at a predetermined determination point in the image captured by the imaging device using a road edge regression line generated by detection points of the road edge as population, and
when the road edge slope is out of a predetermined normal range, the traveling lane specification unit (i) determines a recognition result of the road edge as an erroneous result, (ii) does not use the recognition result of the road edge in specifying of the traveling lane of the subject vehicle, or (iii) interrupts the specifying of the traveling lane of the subject vehicle.

* * * * *